United States Patent [19]

Chencinski et al.

[11] Patent Number: 5,355,406
[45] Date of Patent: Oct. 11, 1994

[54] INTEGRATED APPLICATION CONTROLLED CALL PROCESSING AND MESSAGING SYSTEM

[75] Inventors: Arnold Chencinski, Mountain View; David J. Ladd, Saratoga; Michael A. Liberty, Fremont; Robert H. Sinn, Sunnyvale, all of Calif.

[73] Assignee: VMX, Incorporated, San Jose, Calif.

[21] Appl. No.: 24,796

[22] Filed: Mar. 1, 1993

Related U.S. Application Data

[63] Continuation of Ser. No. 660,279, Feb. 21, 1991, abandoned.

[51] Int. Cl.$^5$ .................... H04M 1/64; H04M 3/42
[52] U.S. Cl. ............................. 379/88; 379/67; 379/89; 379/201; 379/214
[58] Field of Search ............... 379/67, 88, 89, 201, 379/211, 213, 214

[56] References Cited

U.S. PATENT DOCUMENTS

| | | |
|---|---|---|
| 3,111,561 | 11/1963 | Dunning . |
| 3,347,988 | 10/1967 | Marill et al. . |
| 3,482,057 | 12/1969 | Abbott et al. . |
| 3,510,598 | 5/1970 | Ballin et al. . |
| 3,614,328 | 10/1971 | McNaughton et al. . |
| 3,793,487 | 2/1974 | Kilby . |
| 3,859,473 | 1/1975 | Brown et al. . |
| 3,862,372 | 1/1975 | Deutsch . |
| 3,867,582 | 2/1975 | Weed et al. . |
| 3,881,156 | 4/1975 | Deutsch . |
| 3,885,103 | 5/1975 | Smith et al. . |
| 3,978,294 | 8/1976 | Limiero et al. . |
| 3,985,971 | 10/1976 | Colpoys . |
| 3,989,901 | 11/1976 | Neuwirth et al. . |
| 4,086,438 | 4/1978 | Kahn et al. . |
| 4,088,838 | 5/1978 | Nakata et al. . |
| 4,112,261 | 9/1978 | Shiff . |
| 4,125,748 | 11/1978 | Nahabedian et al. . |
| 4,152,547 | 5/1979 | Theis . |
| 4,191,855 | 3/1980 | Sakai . |
| 4,200,772 | 4/1980 | Vicari et al. . |
| 4,232,199 | 11/1980 | Boatwright et al. . |
| 4,255,618 | 3/1981 | Danner et al. . |
| 4,327,251 | 4/1982 | Fomenko et al. . |
| 4,356,351 | 10/1982 | Shefler et al. . |
| 4,371,752 | 2/1983 | Matthews et al. . |
| 4,376,875 | 3/1983 | Beirne . |
| 4,413,158 | 11/1983 | Danford . |
| 4,420,656 | 12/1983 | Freeman . |
| 4,439,635 | 3/1984 | Theis et al. . |
| 4,446,553 | 5/1984 | Webber . |
| 4,484,031 | 11/1984 | Gray et al. .................... 307/602 |
| 4,488,005 | 12/1984 | Frantz . |
| 4,600,814 | 7/1986 | Cunniff et al. . |
| 4,602,129 | 7/1986 | Matthews et al. . |
| 4,625,081 | 11/1986 | Lotito et al. .................... 379/88 |
| 4,792,968 | 12/1988 | Katz .................... 379/67 |
| 4,809,321 | 2/1989 | Morganstein et al. . |
| 4,878,240 | 10/1989 | Lin et al. .................... 379/67 |
| 4,926,462 | 5/1990 | Ladd et al. . |
| 5,003,577 | 3/1991 | Ertz et al. .................... 379/89 |

FOREIGN PATENT DOCUMENTS

| | | |
|---|---|---|
| 0090663 | 7/1981 | Japan . |
| 0129469 | 10/1981 | Japan . |
| 0054492 | 3/1982 | Japan . |

OTHER PUBLICATIONS

"Unanswered Call Diverter", IBM Technical Disclosure Bulletin, vol. 25, No. 7A, Dec. 1982, pp. 3480-3481.

(List continued on next page.)

Primary Examiner—James L. Dwyer
Assistant Examiner—Fan Tsang
Attorney, Agent, or Firm—Haverstock, Medlen & Carroll

[57] ABSTRACT

An integrated application controlled call processing and messaging system for use with a telephone system. The preferred embodiment comprises a PBX or central office system (Centrex) coupled to a voice messaging system to which an applications processor is coupled. The PBX and voice messaging system supply information related to the incoming telephone call to the applications processor. The applications thereafter begins execution of a call processing flow program designed to handle the processing of the incoming call and associated messages.

20 Claims, 19 Drawing Sheets

OTHER PUBLICATIONS

M. Hills & S. Kano, "Programming Electronic Switching Systems-Real-Time Aspects and Their Language Implications", pp. 9 & 21-47, IEEE Telecommunications Series 3 (Peter Peregrinus Ltd. 1976).

"Rolm Centralized Attendant Service", Rolm Corp. (1979).

"AIS Automatic Intercept Service Versatile Efficient Information Service", Fujitsu Limited (date stamped 1972).

"Data Set 407 Interface Specification", AT&T (Jun. 1975).

"ROLMphone User guide", pp. 2-4, 17, 24, 83, and 86 (Rolm Jul. 1985).

L. Goeller, Jr. & J. Goldstone, "The ABCs of the PBX", Datamation pp. 9-13 (Apr. 1983).

T. Kopec & P. Lind, "Electronic Business Telephone", GTE Automatic Electric Journal pp. 34-40 (Mar. 1980).

K. Tapper & P. Thatte, "GTD-1000 Digital PABX CAS Main/ACD", GTE Automatic Electric Journal, pp. 182-193 (Nov. 1980).

R. Kaloian, "What if you cut over a new telecom system . . . and nobody used it?", Communication Age, pp. 46-47 and 50 (Sep. 1986).

Aspen Voice Message Systems Data Sheets, Octel Communications Corp., 1985.

ROLM Phonemail Integration for Meridian SL-1 PBX Systems, Programming Announcement, IBM Corporation, (Sep. 8, 1987).

Voice Messaging Integrated with PBX and Centrex, Octel Communications Corporation, (Apr. 1988).

AUDIX: Audio Information Exchange, AT&T Information Systems.

Specifications for CINDI II VOICE MA053550380 IL, Genesis Electronics Corporation, (1987).

INTEGRATED APPLICATION CONTROLLED CALL PROCESSING AND MESSAGING SYSTEM

This is a continuation of application Ser. No. 07/660,279, filed Feb. 21, 1991 now abandoned.

FIELD OF THE INVENTION

The present invention relates to the field of call processing and messaging systems. Specifically, the present invention relates to call processing and voice messaging systems for a telephone network.

BACKGROUND OF THE INVENTION

An important aspect of most any business or organization's daily operations is the ability to handle incoming telephone calls in an efficient and timely manner. One well known way to handle a multitude of incoming telephone lines is the use of a private branch exchange (PBX) or central exchange (Centrex). A PBX or Centrex is a telephone exchange system serving an organization, which may be coupled with multiple incoming and outgoing trunk lines and multiple telephone sets at the organization's premises. PBX or Centrex systems provide a variety of functions such as switching of calls from the incoming trunk lines to any of the extensions, switching calls between two extensions, and switching calls between extensions and outgoing trunk lines. Numerous PBX and Centrex systems are well known and commercially available.

A number of call processing and voice messaging systems are known in the art and are commercially available which may be coupled with a PBX or Centrex and used to automate the answering of incoming calls from the outside telephone network and the taking of messages when the extensions are not answered by the called parties. Such voice messaging systems incorporate features such as the recording of voice messages for users in what are known as user's "mailboxes". Such voice messaging systems may be accessed by users calling from PBX extensions or from the telephone network over incoming trunks.

These prior systems can be categorized into four main types of systems: 1) call processing systems sometimes called automated attendant systems for directing incoming calls to an extension, 2) call processing systems usually called voice messaging systems for handling a call that does not complete connection to an extension, 3) two-way voice messaging systems or voice store and forward systems for speaking messages to a caller from fixed address mailboxes, and 4) interactive voice response systems for retrieving data from a database of information in response to a caller request and speaking messages to a caller.

In the first category of prior art systems, the automated attendant system answers incoming trunk calls by instructing the PBX or Centrex to direct the incoming calls to a group of extensions. Voice ports of the system are coupled with this group of extensions and appear to the PBX or Centrex simply as single line telephone sets. Typically, the automated attendant system will answer a call directed to it and provide a prerecorded voice message asking the caller to enter the extension number to which he/she desires to be connected. Depending on the specific automated attendant system, the caller may be offered the option of being transferred to a PBX or Centrex attendant. Examples of such automated attendant systems include Dytel, Inc. and a call processing and voice messaging system called Direct Access Link (D.I.A.L) manufactured by the assignee of the present invention.

In the second category of prior art systems, an important voice messaging function is included for the handling of calls which do not successfully complete connection to the originally intended extension (the extension was busy, did not answer, or had been intentionally places in a mode in which it was not accepting calls). Such a function may be accomplished in known voice messaging systems by instructing the PBX or Centrex to forward all such unanswered calls to a group of extensions coupled with the voice ports of the voice messaging system. The voice messaging system may then answer the uncompleted calls. Various methods are known in the art whereby the PBX or Centrex systems provide information to the voice messaging system regarding the identification of the caller and the called party. See U.S. Pat. No. 4,926,462, Ladd et al. Depending on the specific voice messaging system, the caller may be allowed to leave a voice message or call another extension. Known prior art systems of this kind include a call processing system manufactured by Digital Sound, Inc., Octel, Inc., AT&T, Inc. and a call processing and voice messaging system called Direct Access Link (D.I.A.L) manufactured by the assignee of the present invention.

The third category of prior art systems include two-way voice messaging systems for storing and forwarding voice messages from preassigned fixed mailbox addresses between users of such systems. Each user of such a two-way voice messaging system is assigned a "voice mailbox" which he/she uses to record and send messages to other users and to listen to messages received from other users. These fixed mailbox addresses are typically configured and installed in the voice messaging system when a new "user" is added to the system. Such a prior art system is disclosed in U.S. Pat. No. 4,602,129, Matthews et al.

The fourth category of prior systems include interactive voice response systems for retrieving data from a database of information in response to a caller request. The retrieved data is then converted to audible form and spoken as a message to a caller. For example, a prior art system may be used by a caller to audibly receive the balance in a bank account. These interactive voice response systems are typically limited to a specific set of applications where transactions between a caller and the system are highly predictable. Such an interactive voice response system is manufactured by Intervoice Inc. of Dallas, Tex.

Several problems have arisen with these prior art approaches for a call processing, voice messaging, or interactive voice response system. The main drawback with prior art call processing and messaging systems is a lack of flexibility, or in the case of an interactive voice response system, the inability to design applications which take advantage of the capabilities of a call processing and messaging system. Such systems are limited in their ability to be customized for the various applications in which a call processing and messaging system might be used. For example, the prior art automated attendant systems can be improved to provide a means for directing a call to different extensions depending upon many application and caller-specific conditions. Such conditions include, for example, the identity of the caller, account status of the caller, and a variety of other conditions specific to a particular application. If calls to a desired extension are not completed, stored application-related voice information such as customer-specific instructions can be spoken to the called party. Prior art systems are unsuited to the unpredictable and variant needs of these diverse call processing applications.

It is often convenient for an organization to have a single incoming telephone number used for general customer assistance or general information. It would be desirable to provide more flexibility in handling such calls. In prior art systems, incoming calls to such a general information telephone number would be routed to the fixed address associated with the telephone line which could be routed to one available (i.e. not busy) called party of a group of called parties. Thus, a fixed mailbox for each called party in the group of called parties would be used to inconveniently store messages for a general assistance line. Callers using prior art systems and the organization receiving incoming telephone calls are not able to communicate in an application-specific, individualized, and efficient manner. Such systems can be improved by allowing any message to be routed to any available mailbox. Prior art systems often require intervention by a live operator in order to properly handle incoming telephone calls. In addition, applications using prior art systems are often slaved to the capabilities provided by the system and not to the needs of the particular application.

Prior art interactive voice response systems are not flexible enough to respond in various ways to the content of information retrieved from a database in a particular application. Such systems can be improved by incorporating processing logic into the system for tailored handling of the vast number of different cases and situations presented by a database of information in many diverse applications. In addition, as situations or conditions change, prior art systems can be improved by allowing call and message processing logic modification without disrupting normal operation of the system.

It is therefore an object of the present invention to provide a call processing and messaging system that integrates PBX or Centrex call information with application-specific and database information to create a more flexible and adaptable system customized to the needs of a particular application using the call processing and messaging system. It is a further object of the present invention to provide a call processing and messaging system that may handle calls differently depending on the source of the call. It is a further object of the present invention to provide a call processing and messaging system that does not require a fixed mailbox address to be associated with calling or called parties. It is a further object of the present invention to provide a call processing and messaging system that uses customized logic to handle incoming calls and messages. It is a further object of the present invention to provide a call processing and messaging system that allows customized call processing and messaging logic to be modified while the system is still operating.

SUMMARY OF THE PRESENT INVENTION

An integrated application controlled call processing and messaging system for improved call processing and voice messaging is disclosed. The preferred embodiment of the present invention comprises a PBX or Centrex to which a prior art voice messaging system is coupled. An applications processor of the present invention operates in conjunction with the voice messaging system and, in some cases, a host computer. Using information from the PBX or Centrex, the voice messaging system, optionally the host computer, and tables internal to the application's processor and the voice messaging system, the present invention integrates information from multiple sources and controls call and message processing in a seamless applications environment. The present invention uses voice messages as input and output permitting them to be created and controlled by applications free from the restrictions of a prior art fixed voice mailbox addressing methods.

The present invention includes a Call Flow programming language. The Call Flow Language is a collection of commands and statements used by the applications processor for handling an incoming telephone call. Using the call flow language, call handling capabilities allow the development and customization of call handling, message processing and voice response applications. These call and message handling capabilities include call processing, voice messaging, interactive voice response, host data base access, call routing features, and local data base access. Application call flows are derived from the call language to develop and customize call processing and messaging applications. An application flow is the programming code based on the call flow language. A flow is comprised of a series of statements that follow the call flow language syntax. The applications processor interprets and executes the flows into usable applications. A particular application flow or program flow is made up of a series of flow statements to be performed in sequential order.

A flow program consists of three sections: VARIABLES, DEFAULTS, and COMMANDS. Flow statements are written and organized following the order of these sections. VARIABLES are items used for information storage and retrieval. The current value of a variable can be changed during flow execution. The call flow language also makes direct use of some system configuration tables and application specific tables. These tables are used to acquire information needed to process a call. Dynamic variables may also be defined in a call flow statement. The DEFAULTS section of a flow program is used to specify default handlers that could occur within a flow. The COMMANDS section, which is the body of the flow program, contains the actual flow statements that control how a call is handled. Statements are executed sequentially unless a GO TO or GO SUB statement transfers control to a different place in the program, or a condition transfers execution to a default handler. The body of a flow program begins with the first executable statement and terminates whenever an end flow statement is encountered.

Other functions and features of the present invention will become apparent from the detailed description of the preferred embodiment.

DETAILED DESCRIPTION OF THE PREFERRED EMBODIMENT

An integrated application controlled call processing and messaging system is described. In the following description, numerous specific details are set forth such as specific prompts and menus, specific codes, etc. in order to provide a thorough understanding of the present invention. It will be apparent, however, to one of ordinary skill in the art, that the present invention may be practiced without the specific details. In other instances, well known circuits, structures and techniques have not been shown in detail in order not to unnecessarily obscure the present invention.

The present invention is an integrated application controlled call processing and messaging system for controlling the processing of calls and messages received on incoming telephone lines. Although the following description makes specific reference to PBX systems, the present invention anticipates the use of the disclosed application controlled call processing and messaging system with other telephone switching systems such as a key system, central office or Centrex system, or hybrid system. Further, the methods for processing calls and messages described herein may be practiced in a system utilizing an external voice messaging system or may be equally practiced in a telephone switching system which provides the features of a voice messaging system as in integral function of the switching system. The methods for processing calls and messages described herein may be applied in a variety of systems in which the required call information may be obtained through the methods and apparatus detailed herein or through other methods and apparatus. It will be appreciated that the methods of processing calls and messages are not intended to be limited to use of the disclosed methods and apparatus for obtaining call information, except as specifically provided in the claims.

Figure 1:
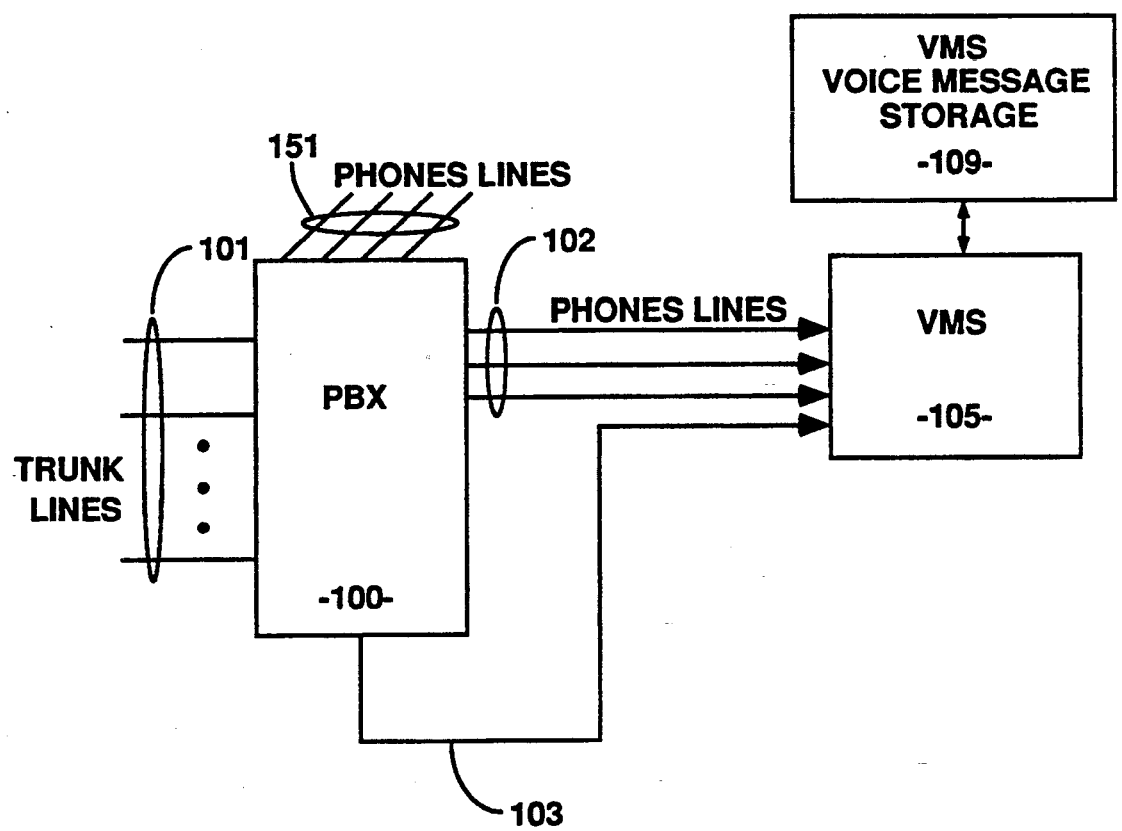
FIG. 1 is a block diagram illustrating a prior art call processing and messaging system.

Referring to FIG. 1, a prior art call processing and messaging system is illustrated. As shown, trunk lines 101 connect with PBX 100. Individual telephone lines 151 are provided for direct connection of telephone handsets. Individual telephone lines 102 connect PBX 100 with a voice messaging system (VMS) 105. One such voice messaging system is the Direct Access Link (D.I.A.L) manufactured by the assignee of the present invention. A voice message storage device 109 connects to voice messaging system 105. Control line 103 connects PBX 100 to VMS 105. Control line 103 provides VMS 105 with useable information regarding the source of the call.

Using the voice messaging system as illustrated in FIG. 1, calls coming in on trunk lines 101 may be transferred to one of a plurality of telephones connected to telephone lines 151. If the telephone thus connected is busy or does not answer, the call may be forwarded to VMS 105 for further processing. Alternatively, calls coming in on trunk lines 101 may be transferred directly to the appropriate line of telephone lines 102. VMS 105 may thereafter handle the incoming telephone call using an automated attendant capability or a voice messaging or two-way voice messaging capability with a voice mailbox stored on voice message storage device 109. Storage device 109 contains a plurality of mailboxes each for storing a plurality of voice messages. In the prior art system, each mailbox stored on storage device 109 is associated with one of the extension numbers associated with telephone lines 151 or a predetermined party.

Figure 2:
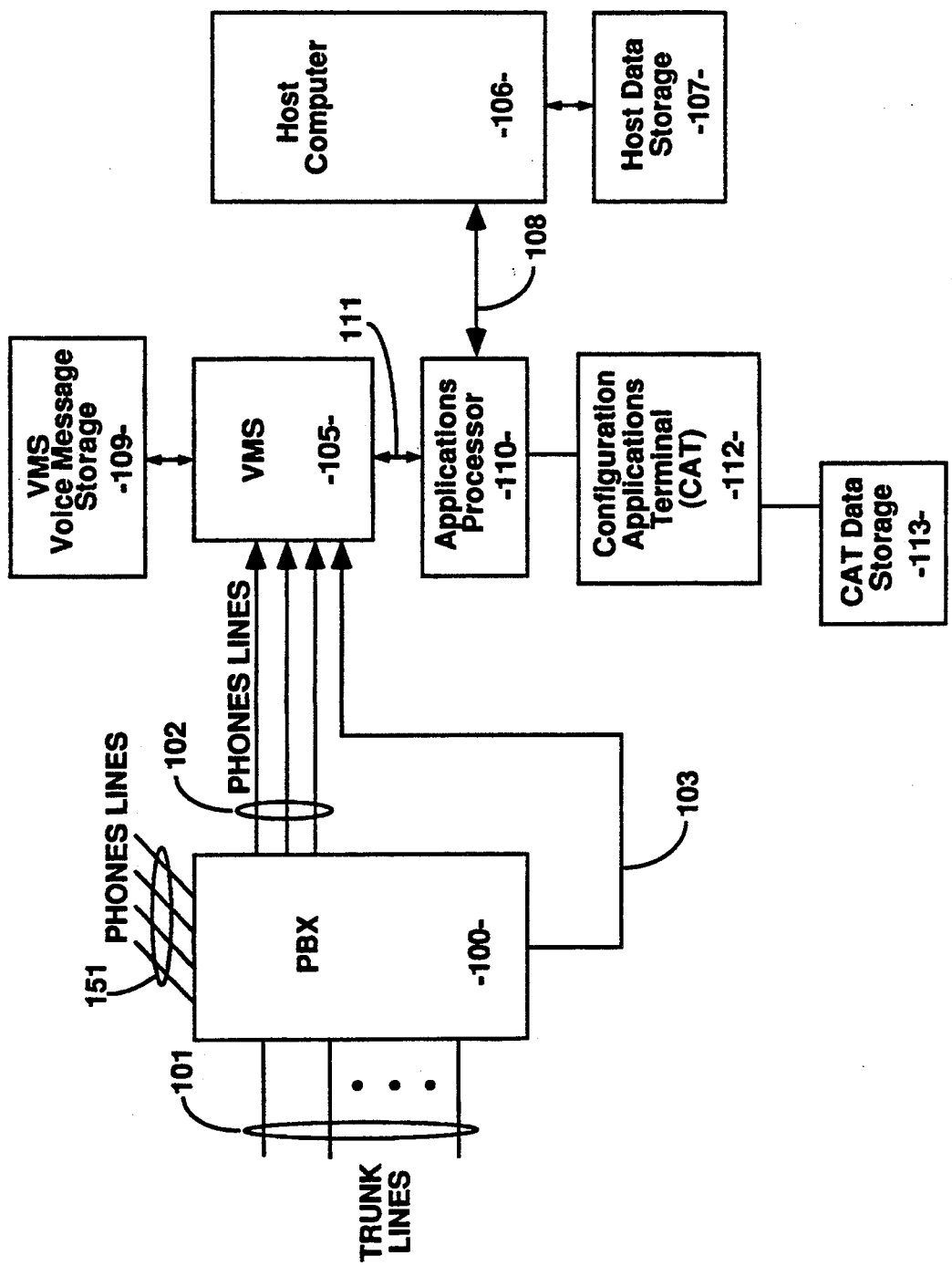
FIG. 2 is a block diagram illustrating a call processing and messaging system as may be utilized by the preferred embodiment.

Referring now to FIG. 2, the integrated application controlled call processing and messaging system of the present invention is illustrated. As shown, the preferred embodiment is coupled to components of the prior art. Specifically, PBX 100, VMS 105, and voice message storage 109 are prior art components as illustrated in FIGS. 1 and 2. The hardware components of the present invention include applications processor 110, an optional configuration applications terminal (CAT) 112, CAT data storage component 113, an optional host computer 106 and host data storage unit 107 as illustrated in FIG. 2. In the preferred embodiment of the present invention, applications processor 110 is a circuit board that is inserted into an available slot in VMS 105. It will be apparent to those skilled in the art that the applications processor 110 need not reside on a separate circuit board. For example, an applications processor may be included as an internal component of a prior art call and message processing system. A prior art call and message processing system and associated operating system may also be modified to perform the application processing function of the present invention. The present invention is thus not limited to the specific architecture of the preferred embodiment.

Figure 3:
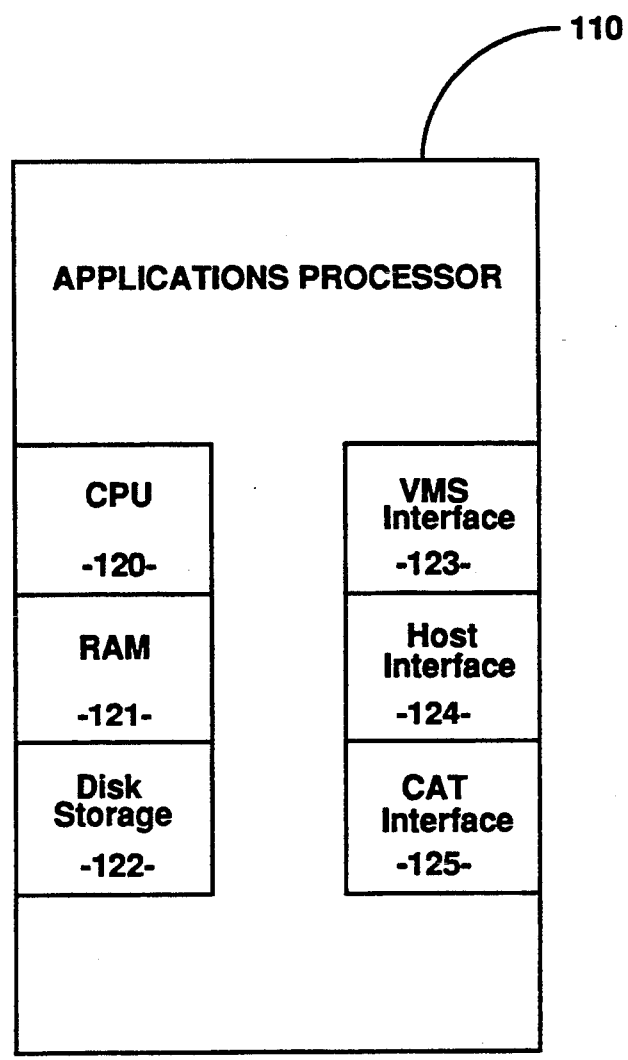
FIG. 3 is a block diagram of the internal architecture of the applications processor.

Referring to FIG. 3, applications processor 110 includes a microprocessor CPU 120, random access memory (RAM) 121 and a disk storage device 122 for storing local data. Applications processor 110 also includes a VMS interface 123, host interface 124 and a CAT interface 125. VMS interface 123 is a high speed internal command link permitting command signals and events and status information to be transferred between VMS 105 and applications processor 110. In the preferred embodiment, host interface 124 is an IBM 3270 SNA/SDLC compatible interface. Such an interface protocol is well known in the art. Host interface 124 is optionally used for coupling applications processor 110 to a host computer in order to access external data residing thereon. It will be apparent to those of ordinary skill in the art that alternative interface protocols can be used for interfacing with a host computer. CAT interface 125 provides means for configuring the operation of applications processor 110 and for generating and modifying call flows. In the preferred embodiment, a personal computer is used as CAT 112 to which a disk storage device 113 is coupled. In this embodiment, CAT interface 125 is an RS232 interface well known in the art. In alternative embodiments, CAT interface 125 may be implemented using other interface protocols. Similarly, alternative embodiments may use other than a personal computer for a configuration application terminal. For example, a standard ASCII data tern-final may be used for this purpose. Once configured, the operation of the present invention does not require the connection of the CAT 112.

The present invention integrates the messaging capabilities of the VMS 105 with the flexible control of a call flow processing language to provide a powerful call and message handling environment. The call flow language of the present invention is a programming language for specifying an application-specific sequence of events and operations in response to an incoming telephone call or system event. The call flow language allows a flow programmer to design and build custom applications incorporating various call and messaging features. In the preferred embodiment, the applications processor 110 uses the voice message handling and storage capabilities of VMS 105 while allowing the operation of VMS 105 to be directed under control of the applications processor 110 and the call flow language commands executing therein. It will be apparent to those skilled in the art that the scope of the present invention is not limited to an architecture using the voice message handling and storage capabilities of VMS 105. Equivalent alternative embodiments may be implemented where message handling and storage is controlled directly by the applications processor.

Using the call flow language, call flows for various applications of an organization may be generated and stored for access by applications processor 110. Each flow is a script defining the operations for handling an incoming telephone call. Using this method, incoming calls and associated messages are controlled by an application flow and not by a mailbox. Moreover, more than one call flow can be used for handling a particular incoming call. Also, a particular call flow can be used simultaneously by more than one incoming call.

In operation, incoming telephone calls are received by VMS 105 on phone lines 102. The initial task of the present invention is to assign a call flow to a particular incoming call. The call is thereafter processed depending upon the command sequence coded in the particular call flow. In the preferred embodiment, incoming calls are assigned to a call flow using a set of system configuration tables residing in applications processor 110.

When an incoming call is received by VMS 105, VMS 105 can be configured to pass call control to applications processor 110 via interface 111. Using PBX integration information passed to VMS 105 via control line 103, call control information is passed to applications processor 110 by VMS 105. This call control information includes, for example, the trunk number of the incoming call, the port number, extension number or the mailbox number associated with the incoming call, and in some cases, status information indicating a reason why the call was passed (i.e. the extension was busy). The VMS 105 may also pass to applications processor 110 the called party ID and/or the calling party ID number. Once the applications processor 110 receives the call information, the call is processed using information in the system configuration tables.

Figure 5:
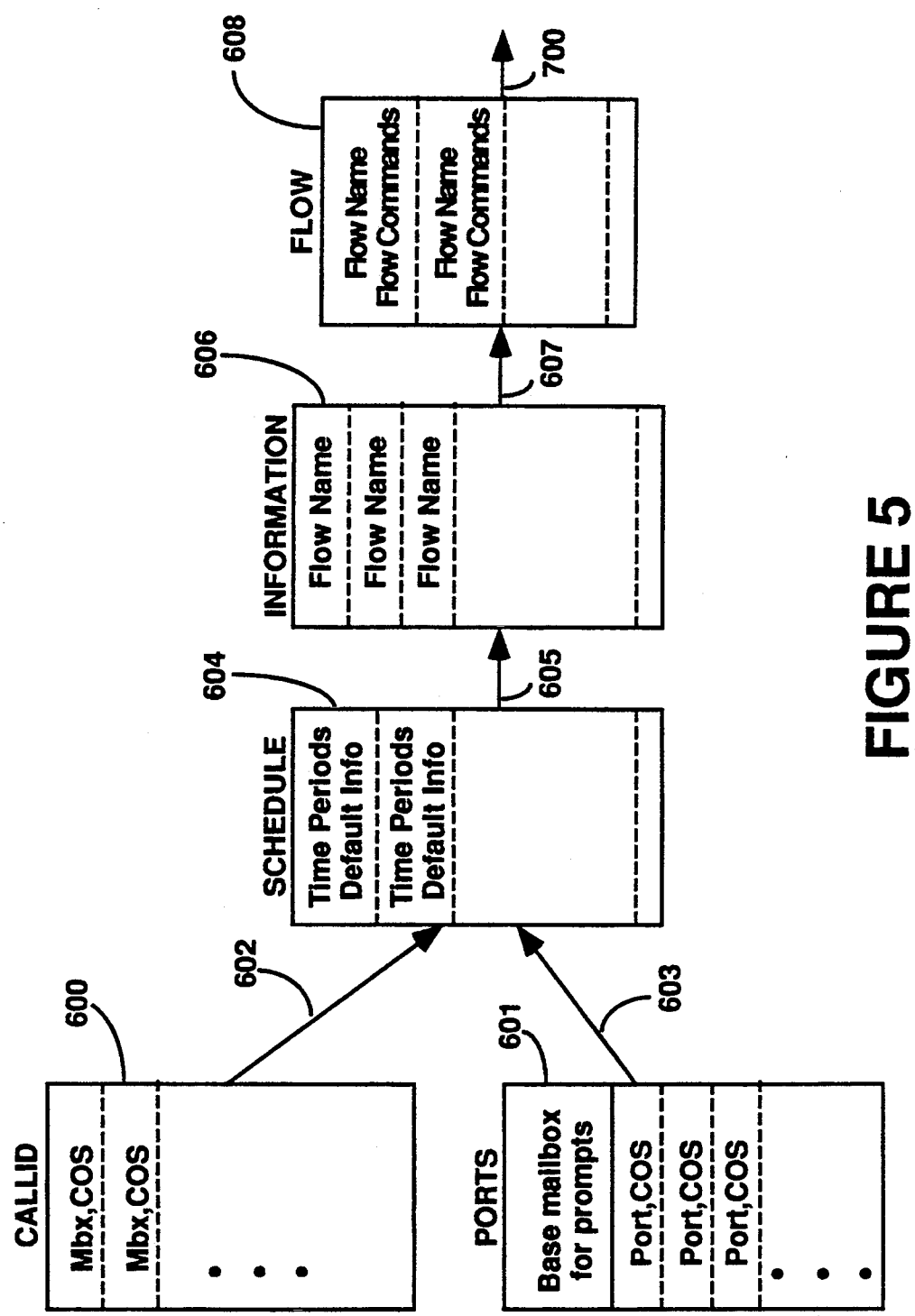
FIGS. 5 and 6 illustrate the linkage of tables of the applications processor.

Referring now to FIG. 5, applications processor 110 first checks a CALLID table 600 to determine the class of service (COS) to be assigned to the call. If VMS 105 passes a called party ID to applications processor 110, applications processor 110 searches CALLID table 600 for an entry that matches the called party ID number. If the applications processor 110 references CALLID table 600 and does not find an entry corresponding to the number associated with the call, the applications processor 110 references PORTS table 601. PORTS table 601 is used to determine the class of service (COS) to be assigned to the call where a called party ID is not available.

Figure 7:
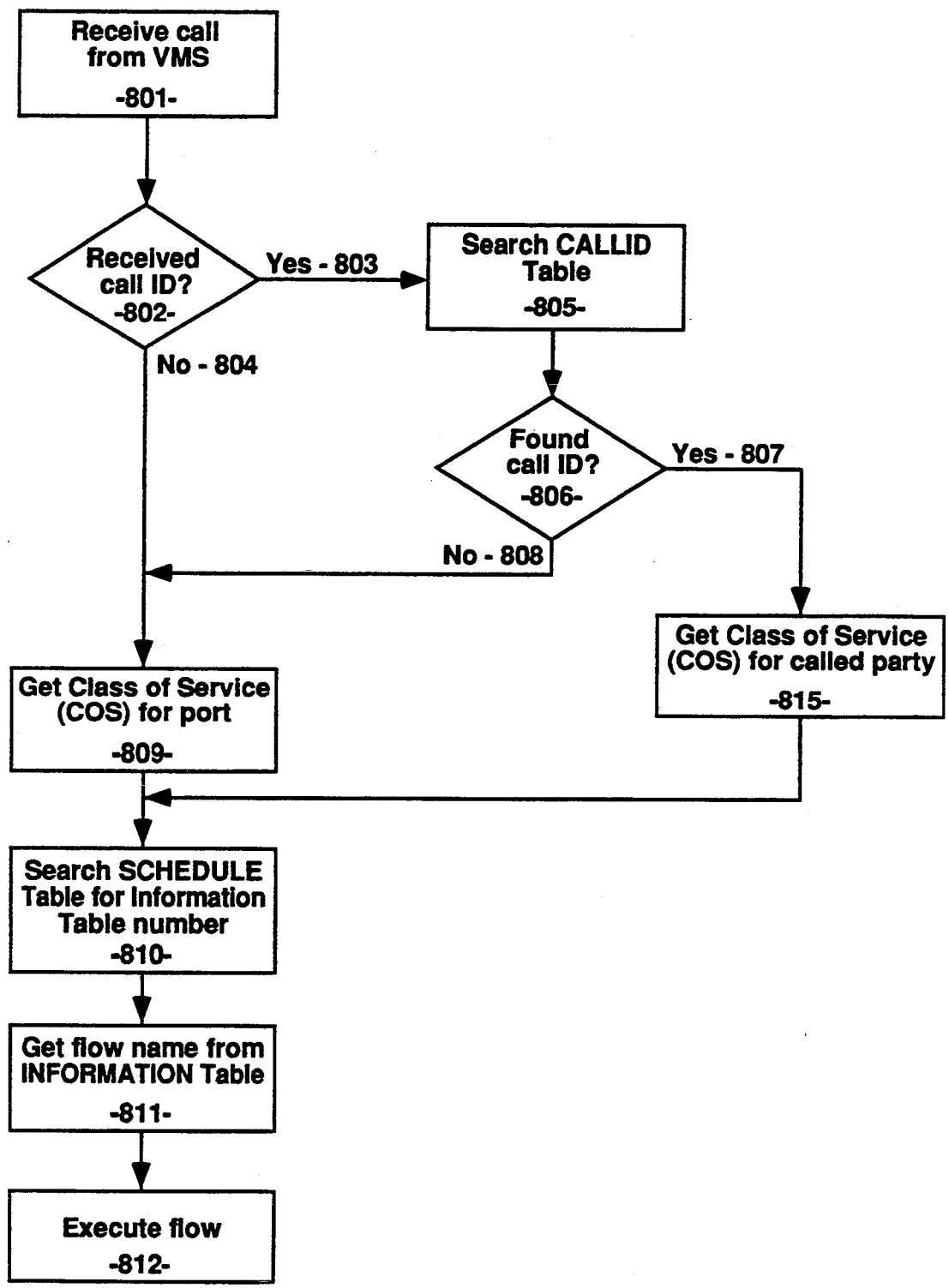
FIG. 7 is a flow chart illustrating a method of handling incoming calls as may be utilized by the preferred embodiment.

After a COS is assigned to the call, the applications processor selects one of a plurality of schedule tables 604, each corresponding to a particular COS. The specific schedule table 604 that is selected is based on day of week and time of day when the call is received. Each schedule can have as many as eight time periods in the preferred embodiment. The applications processor 110 uses the selected schedule table number to locate the information table number to be assigned to the call. Applications processor 110 then checks the information table 606 corresponding to the information table number to determine the name of the flow to be used to process the call. The information table 606 associates an information table number with a flow name, which is then assigned to the call. If the information table 606 does not contain a flow name corresponding to the call, a user error is logged. After a flow name is assigned to the call using information table 606, the applications processor 110 checks flow table 608 to find the appropriate flow to execute. Flow table 608 associates the assigned flow name with a flow containing a set of instructions. At this point, applications processor 110 begins to execute the instructions in the assigned flow. FIG. 7 illustrates the sequence of operations taken from the receipt of an incoming call to the execution of an associated call flow.

Figure 6:
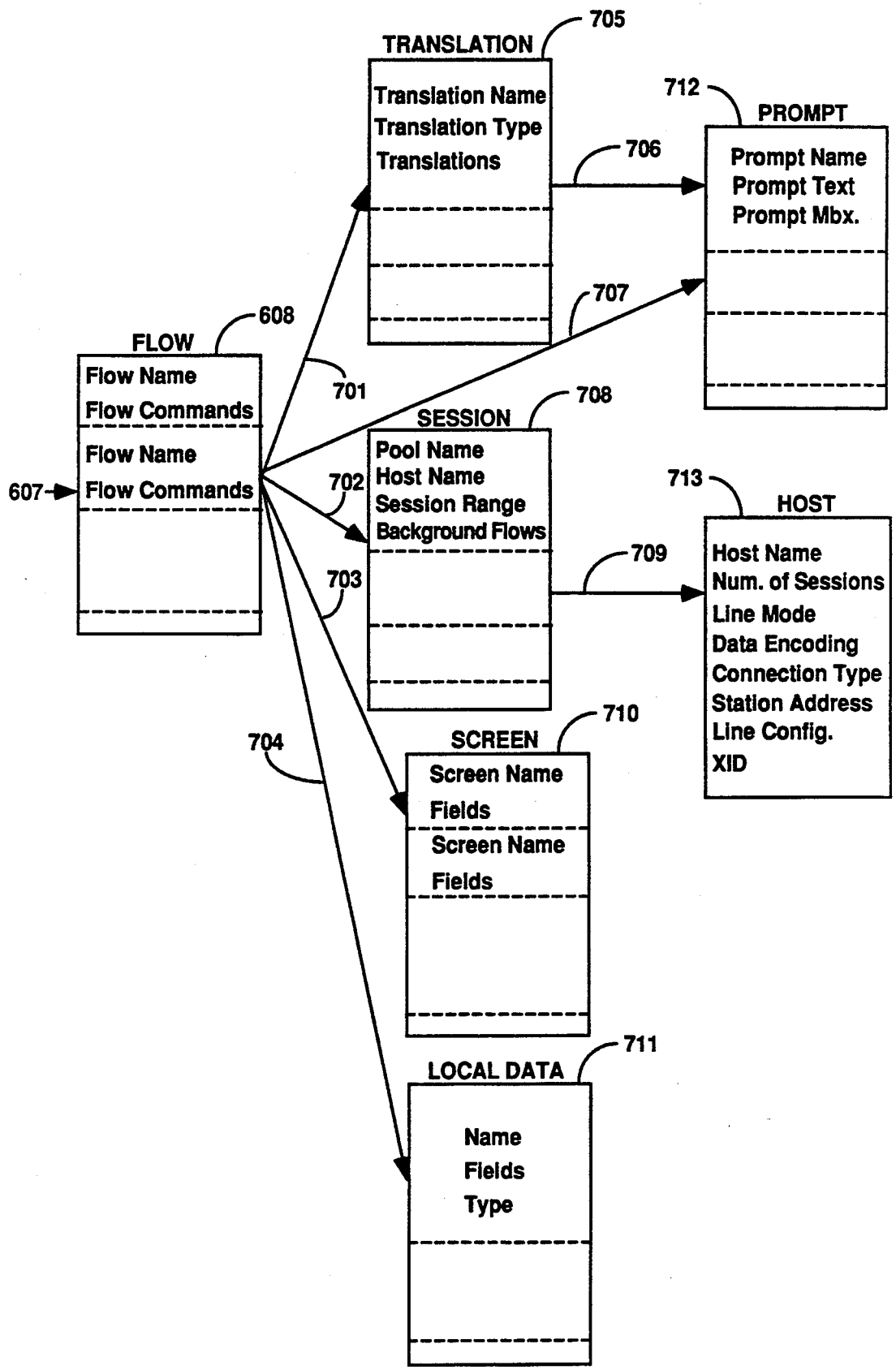

After a call flow begins to process a call, additional application-specific tables are provided for handling an incoming call. These additional tables include: a HOST table, a PROMPT table, a SCREEN table, a SESSION table, a TRANSLATION table, a LOCAL DATA table, and a SYSTEM PARAMETER table. A particular application may not require all of the configuration tables listed above. In fact, a flow may not reference a table at all. For example, if a flow does not require a host application, the flow for the application does not reference the HOST table, SCREEN table, or the SESSION table. FIG. 6 illustrates the linkage between the available configuration tables and commands within flow table 608.

The HOST table 713 is used to describe how the applications processor communicates with the host computer to which it is optionally connected. There are two aspects to each HOST table entry: the physical link between the applications processor and the host, and the data link of the host connection. The physical link describes the characteristics of the connection between the host computer and the applications processor. This information consists of: host name, number of sessions, line mode, data encoding method, and connection type. Host name is the name assigned to the host connected to the applications processor. The number of sessions represents the total sessions configured in the SESSION table. Sessions are described in more detail below. Line mode specifies whether the data communications line 108 is operating in a full duplex or half duplex mode. The data encoding method refers to the way bits 0 and 1 are encoded. Connection type specifies whether the connection between the applications processor and the host is switched through a modem or non-switched through direct lines.

The second aspect of each HOST table entry contains information about the data link level of the host connection. This portion of the HOST table entry describes the type of device being emulated by the applications processor. The data link portion of a HOST table entry describes the applications processor connection to a host computer. This portion of the HOST table entry contains the following information: station address, line configuration, and XID (exchange identification). The station address specifies origin and destination stations connected via the host computer data communications line. Line configuration specifies whether the data communications line is connected between two or more stations. For example, if one line connects two stations, the line configuration is set to a value of 2. If one line connects more than two stations, the line configuration is set to a value corresponding to a multipoint connection. XID is an acronym meaning exchange identification. XID consists of product identification and installation identification. In the preferred embodiment, the applications processor emulates an IBM 3274 cluster controller. The product identification in this case is 017.

The PROMPT table 712 contains information about voice prompts. The PROMPT table includes prompt names and up to 128 characters of prompt text. When a call flow references a prompt name, the PROMPT table is used to find the voice mailbox where the prompt is stored.

The SCREEN table 710 is used to identify each host application screen accessed by the applications processor. A host applications screen, or host screen is generated by the host computer. A host screen contains fields in which data is entered for processing or retrieving information associated with an incoming telephone call. Some of the fields on a host screen are used only by the host; others are used by both the applications processor and the host computer. Each SCREEN table entry corresponds to one host screen. The SCREEN table contains a list of field definitions for all the fields relevant to a particular application. Each screen table contains the following field definitions: field name, offset base, field offset, field length, protection level, and data type. The field name is a name assigned to a field in the host screen. This field name is used in call flows to specify the location for data entry or retrieval. Offset base is a parameter that specifies whether the field offset is absolute or relative to the cursor. Field offset is the exact location that specifies where the field starts. Field length specifies how many characters the field occupies. Protection level is a data item indicating when the data can be only retrieved (read only) or unprotected when the data can be entered retrieved or placed (read/write). The data type parameter is used to indicate whether the field is alphanumeric or numeric only.

The SESSION table 708 is used to group host sessions into pools. A session is a logical connection between the applications processor and a host computer. A session links the application flow in the applications processor to the host computer. Through a session, the applications, processor accesses the host computer to get the information requested from the application call flow. Generally, a session pool contains all the sessions executing in a given application. By grouping the sessions into pools, multiple callers can simultaneously access an application while another group of callers can access a different application (on another pool). There is one SESSION table entry for each application. Each SESSION table entry contains the following: pool name, host name, session number range, logon flow name, clean-up flow name, idle flow name, and maximum idle time. Pool name is a name used by the application flow to refer to the session pool. A flow can get a session from this pool. Host name is a name given to the host. This name must be the same as one defined in the HOST table. Session number range is the number of sessions allocated for a particular pool. Logon flow name is the name of the flow to be used when the applications processor first communicates with the host after a session power-on event. Clean-up flow name is the name of the flow used to bring up the first screen of a particular application, when a flow has freed the session explicitly, has reached an ENDFLOW statement or has exited abruptly. Idle flow name is the name of the flow used to prevent the session from logging off when no host access is performed for a period of time (idle time). Maximum idle time is the time range between which the idle flow is run.

The TRANSLATION table 705 contains individual sets of translation items that are paired together to create a relationship in the form of a SEARCH-ITEM and a RETURN-ITEM. A translation refers to a single item in a TRANSLATION table, for example, a SEARCH-ITEM that translates into a RETURN-ITEM. In the TRANSLATION table, SEARCH-ITEMs are used to find a corresponding RETURN-ITEM. RETURN-ITEMs are used to provide information to the caller. This information corresponds to the RETURN-ITEM configured to match a SEARCH-ITEM. For example, if a call flow instructs the caller to enter a code (representing a SEARCH-ITEM), the applications processor would use that entry to check the list of SEARCH-ITEMS configured in the TRANSLATION table. Once the item is found in the table, the applications processor can deliver to the caller the matching item (RETURN-ITEM) in a spoken form.

The LOCAL DATA table 71 1 contains information about local databases. Each table entry serves as a definition of a data base, identifying the data base structure and type. A data base consists of a collection of records, each containing several fields of data. When a local data base is defined by making a LOCAL DATA table entry, the data base is assigned a structure that describes the format of the individual records in the data base. This structure consists of group of field names. Optionally, one field name in the group can be assigned as the index field. Each local data base has a data base type that determines which flow commands can be used to access records. Additionally, the data base type identifies whether flows can modify records or simply retrieve records. The present invention provides at least three different data base types: look-up only, read/write, and sequential. The look-up only data base allows call flows to retrieve in-formation only. The read/write data base allows flows to retrieve and modify information stored in existing records. The sequential data base allows flows to sequentially retrieve and modify information stored in existing records.

A SYSTEM PARAMETER table contains values that pertain to all activities in the operation of the present invention. These activities can be categorized in five major areas: system specific, report generation, flow control, flow inputs, and flow conditions. System specific parameters include system name, system ID, and the default BAUD rate. Report generation parameters include the number of lines to be printed in each page of a report. Flow control parameters include the maximum duration of all flows. Flow input parameters set the format for inputting entries to be processes by the applications processor. Flow condition parameters specify the values for various time-out and error conditions encountered during the operation of the system.

The preferred embodiment of the present invention uses the voice message handling and storage capabilities of VMS 105 while allowing VMS 105 to be directed under flow language command control. It will be apparent to those skilled in the art that the scope of the present invention is not limited to an architecture using the voice message handling and storage capabilities of VMS 105. Equivalent alternative embodiments may be implemented where message handling and storage is controlled directly by the applications processor.

Voice messages manipulated by applications processor 110 are stored and identified using a message number. The message number for each message is retained by applications processor 110 for later access by a call flow. These message numbers are stored either in a host data base or in an applications processor local data base.

Having described the hardware and system environment of the present invention, the call flow programming language of the present invention is described in the following sections. The Call Flow Language is a collection of commands and statements used by the applications processor for handling an incoming telephone call and associated messages. Using the call flow language, call processing and messaging capabilities allow the development and customization of call processing and messaging applications. These call processing and message handling capabilities include call processing, voice messaging, interactive voice response, host data base access, call routing features, and local data base access. Application call flows are derived from the call flow programming language to develop and customize voice response applications. An application flow is the programming code based on the call flow language. A call flow is comprised of a series of statements that follow the call flow language syntax. The applications processor interprets and executes the call flows into usable applications. A particular application flow or program flow is made up of a series of flow statements to be performed in sequential order. Most statements start with a keyword that identifies the operation performed by the statement. Depending on the statement, the keyword is followed by additional information that must conform to the syntax or structure appropriate for the type of statement. All statements have a statement number associated with them. Statement numbers are generated by the system when the flow program is entered using configuration applications terminal 112.

A flow program consists of three sections: VARIABLES, DEFAULTS, and COMMANDS. Call flow statements are written and organized following the order of these sections. VARIABLES are items used for information storage and retrieval. VARIABLES are conveniently identifiable through the use of descriptive names that are assigned in the variable's section of a call flow. The current value of a variable can be changed during call flow execution. The value of a VARIABLE can be changed during flow execution by a CAPTURE, GET, INPUT, LET, or TRANSLATE command. The call flow language of the present invention also allows numeric and character constants to be used in call flow statements. The call flow language also makes direct use of some system configuration tables and application-specific tables. These tables are used to acquire information needed to process a call.

All the variables used in a flow program are declared in the VARIABLES section. The syntax of the statements in the VARIABLES section include the type of the variable being declared, the length of the variable (optional depending on the type of the variable), and the variable name. Each variable has an associated type. The types of variables supported by the present invention include: NUM, CHAR, and PROMPT. The NUM variable type is used to declare a variable used in arithmetic operations. If a NUM variable needs a decimal point, the number of significant digits to the right of the decimal point must be included in the length portion of the statement. If the number of decimal places is not specified, the variable is considered an integer. The number of decimal places specified determines the range of values that can be stored in the number. The CHAR variable type is used to declare a variable that contains text strings. When declaring a CHAR variable, a length value is required. A length value specifies the maximum length of any string stored in that variable. The maximum length allowed for any CHAR declaration is 132.

CHAR variables may also be used to define dual tone multifrequency (DTMF) variables. These character variables are used in the flow language to dial an extension. They are typically used with the CALL statement. DTMF characters can also be used to outpulse DTMF digits through the SPEAK statement. An example of this usage is DTMF signaling for potential networking applications. To use DTMF characters in a call flow, a variable must be declared as a CHAR variable, and then assigned a value using a command such LET or TRANSLATE.

The PROMPT variable type is used to declare variables that contain a prompt identifier. Prompts are used to urge a caller to take a specified action or make a valid menu selection. Variables of type PROMPT can only be assigned by a TRANSLATE or LET command, and are then spoken using the SPEAK command. The PROMPT declaration does not require a length specifier.

In the preferred embodiment of the present invention, variable names may be made up of letters, digits, and underscore characters. The first character of a variable name must be a letter. No blank spaces are allowed within variable names. A variable name consists of a maximum of 16 characters. An error is generated if a variable name of more than 16 characters is declared.

Dynamic variables may also be defined in a call flow statement. A dynamic variable contains dynamic run time data. The values in these variables are installation or call specific. The value of a dynamic variable can be assigned to a flow variable using the LET command. Dynamic variables are uniquely identified by a two character type prefix, a dollar sign, and the identifier which describes the variable. The five types of dynamic variables provided by the preferred embodiment include: a system variable, a call variable, a host specific variable, local data variable, and flow specific variable. Dynamic system variables are used to reference system-wide values required by a call flow. These values include the current day, current month/year, current time by hour, minutes and seconds, the current day of the week, a random number generator, and a value indicating the number of ports currently being used in the system. Dynamic call variables give specific information about the currently executing call flow. These variables include information such as the original called party ID, the original calling party ID, a caller digit entered on a menu, or the port currently being used by the current call.

Using information provided by the PBX integration line and the VMS, an incoming call can be classified into four different types: an internal direct, internal forwarded, external direct, and external forwarded call. An internal direct call is a call placed from an internal extension directly to the VMS. An internal forwarded call is a call placed from an internal extension to another extension forwarded by VMS on a busy, RNA condition, etc. An external direct call is a call from an external trunk that the PBX connected directly to the VMS. An external forwarded call is a call from an external trunk to an internal extension that forwarded to the VMS on a busy, RNA condition, etc.

A host specific dynamic variable gives specific information about the current host session assigned to the flow. These dynamic variables are used to retrieve the current host session number. Flow specific variables give information about the currently executing flow. This information includes the flow execution time in seconds and the flow status from the last statement executed. Local data base dynamic variables are used to obtain the current value of the current record number in use by a call flow.

The DEFAULTS section of a flow program is used to specify default handlers for conditions that could occur within a call flow. For example, if a caller is prompted with a menu of choices and asked to make a selection by entering a number using the DTMF keypad, the input can time out if no selection is made. If the timeout occurs several consecutive times, a timeout limit condition is set. Using the DEFAULTS section of the present invention, default handling of other system error conditions may be specified.

The COMMANDS section, which is the body of the flow program, contains the actual flow statements that control how a call is handled. Statements are executed sequentially unless a GOTO or GOSUB statement transfers control to a different place in the program, or a condition transfers execution to a default handler. The body of a flow program begins with the first executable statement. All statements in the COMMANDS section are considered part of the body of the program. Execution of a flow terminates whenever an end flow statement is encountered. The following section describes each of the commands provided by the call flow language of the present invention. The syntax of each command and specific examples of the use of each command is also provided.

1. CALL

The CALL statement places a call to the number specified. The port to be used is automatically assigned as the next idle VMS port that is configured for outcall. The call statement is valid only if the flow is not already connected to a port. CALL puts the flow on a port in connected mode.

The syntax for the call command is as follows:
CALL <charvar>

If the specified variable <charvar> contains more than 8 digits, it is assumed to be an external call. If the variable specified contains a valid VMS mailbox, the mailbox extension is called. Otherwise, the extension number contained in the variable specified is called. The extension number must contain valid DTMF characters.

An example of the CALL command follows:
LET AGENTEXT='300'
CALL AGENTEXT

2. CAPTURE

The CAPTURE statement retrieves data from a host screen that has been previously received using the HOSTRCV command.

The syntax for the CAPTURE command is as follows:
CAPTURE <charvar> AT <field> ON <screen>.

CAPTURE retrieves the contents of a field on a host screen and then assigns it to a CHAR variable defined in the VARIABLES section. The screen refers to a screen name previously defined in the SCREEN Table. The field must be the name of a filed previously defined in that specific screen entry.

An example of the CAPTURE command follows:
CAPTURE PASSWORD AT PASSFIELD ON LOGONSCR

3. CONNECT

The CONNECT statement is used to complete a successful transfer of a call to a mailbox or extension. (See TRANSFER command)

The syntax for the CONNECT command is as follows:
CONNECT

An example of the CONNECT command follows:
"Attempt transfer to agent
TRANSFER AGENTEXT
ON CN$FAIL GOTO NOAGENT
"TRANSFER succeeded, so connect the caller to agent
CONNECT

4. DESELECT

The DESELECT statement is used to release current access to a local database. A SELECTed database must be DESELECTed before a flow can successfully execute a GOFLOW statement. A local database is implicitly deselected whenever a flow is terminated.

The syntax for the DESELECT command is as follows:
DESELECT <database>

An example of the call command follows:
DESELECT TRAVEL

5. EDIT

The EDIT statement is used to remove characters and substrings from character strings that are stored in CHAR variables during flow execution.

The syntax for the EDIT command is as follows:
EDIT <charvar> REMOVE CHARS <string>

An example of the call command follows:
(1)
330: LET BAD_CHARS=',$'
340: CAPTURE ACCT_BALANCE AT BALANCE ON ACCT_INFO
350: EDIT ACCT_BALANCE REMOVE CHARS 'BAD_CHARS'
(2)
340: CAPTURE SOC_SEC_NUM AT SSN ON ACCT_INFO
350: EDIT SOC_SEC_NUM REMOVE STRING 'SSN' FIRST

6. ENDFLOW

The ENDFLOW statement completes the processing of a flow. It performs an implicit HANGUP of the VMS port associated with the flow.

The syntax for the ENDFLOW command is as follows:
ENDFLOW [CONDITION]

The keyword CONDITION can be added to an ENDFLOW statement to report the reason for a flow's termination, according to the last condition set in the flow.

An example of the ENDFLOW command follows:
ENDFLOW
ERR:
ENDFLOW CONDITION

7. ENDSUB

The ENDSUB statement terminates the subroutine and directs the flow to exit from a subroutine. Execution continues at the statement immediately following the GOSUB that called the subroutine. (Also see RETURN). It is the last statement in a subroutine. Each subroutine must have exactly on ENDSUB statement.

The syntax for the ENDSUB command is as follows:
ENDSUB

An example of the ENDSUB command follows:
ENDSUB

8. ERASE

The ERASE statement erases a previously recorded message.

The syntax for the ERASE command is as follows:
ERASE <numvar>

The message is a variable declared of type NUM:0 that has a message value set up by a previous RECORD command.

An example of the ERASE command follows:
SEND CUSTMSG TO AGTMBOX
ERASE CUSTMSG

9. FIND

The FIND statement searches for an item using a TRANSLATION Table, or searches for an item in a LOCAL DATA Table.

The syntax for the FIND command is as follows:

1) Finding items in a TRANSLATION Table
FIND <variable> USING <tablename>

Variable contains the data searched for in the TRANSLATION Table, which is specified by <tablename>. Tablename must be the name of a previously defined TRANSLATION Table. If the variable is not found in the TRANSLATION Table, the CN$FAIL condition is set.

2) Finding items in a LOCAL DATABASE Table

The FIND statement is also used to gain access to a specific record in the database. Once a flow FINDs a record, it can use GET to obtain information from the record, or use PUT to put the information into a record. The information in the record can then be updated by using WRITEDB to write a modified record back into the database.

Each of the FIND commands has a specific keyword (NEW, NTH, NEXT, FIRST), which specifies how the database is accessed to FIND the requested record. Only certain FIND statements are allowed on a specific type of database: SEQ, RW, or LU.

A) NEW

FIND NEW RECORD USING <database>

This keyword reserves an uninitialized record at the end of the current sequential database (SEQ). After a FIND NEW statement, the only allowable statements using the local database are PUT followed by a WRITEDB. A record number is assigned after the WRITEDB statement is executed. This record number is stored in the dynamic variable DB$RECORDNUM.

B) FIRST

FIND FIRST RECORD WITH <index> <op> <var> USING <database>

| | |
|---|---|
| <index> | is an index field |
| <op> | can be =, <>, >, <, ≧, or ≦ |
| <var> | is a specific variable to look for |
| <database> | is database name |

This keyword searches the database specified by index, and matches the first record with the specified search condition. The database must also have an index defined.

C) NEXT

FIND NEXT RECORD WITH <index> <op> <var> USING <database>

This keyword operates similarly to FIND FIRST, except that it searches for the database starting from the current record rather than searching from the beginning of the database. The database must also have an index defined.

D) NTH

FIND NTH RECORD WITH RECORD=<integer> USING <database>

| | |
|---|---|
| <integer> | is an integer variable or constant |
| <database> | is the database name |

This keyword accesses a specific record specified by the record number. The record number is specified through the use of an integer variable or constant. This type of access is allowed on all types of databases.

An example of the FIND command follows:
A) Using FIND for TRANSLATION Tables
(1) FIND ERRCODE USING ERRTBL "If error code not found in table, it means no error ON CN$FAIL GOTO NOERR
(2) FIND ACCOUNT USING VALACNTS ON CN$FAIL GOTO INVALIDACNT
B) Using Find for Databases
(1) FIND FIRST RECORD WITH ZIPCODE=INPUTZIP USING LOCATE
(2) FIND NEW RECORD USING SAVEINFO
(3) FIND NEXT RECORD WITH BALANCE>10000.00 USING ACCOUNTS
(4) FIND NTH RECORD WITH RECORD=RCNUM USING ORDERS

10. FREESESSION

The FREESESSION statement frees the host session currently held by the flow. If the SESSION TABLE has a Cleanup Flow associated with the pool to which this session belongs, then the Cleanup flow is run on this session in the BACKGROUND mode.

The syntax for the FREESESSION command is as follows:
FREESESSION [RESET]

If the RESET option is specified, the session is reset after freeing it. This option should be chosen if the session is in an unknown state and the flow program is not able to bring it to a known state. After a reset is complete, the session will go through the normal logon procedures and will eventually be brought to a known state. If the SESSION Table has a Logon flow associated with the session, it is run on the session in the BACKGROUND mode.

An example of the FREESESSION command follows:
FREESESSION
FREESESSION RESET

11. GET

This command retrieves data from an array, or from a local database record.

The syntax for the GET command is as follows:

1) Retrieving Data from an Array
GET <variable> AT <index> USING <arrayname>

Variables declared as arrays can only be used in GET and PUT statements. The variable type must match the array type. Index must be either a NUM:0 variable or an integer constant.

2) Retrieving Data from a Local Database

GET <variable> AT <field> USING <database>

GET assigns the contents of the specified field to the flow variable using the currently selected record in the database. A database record must be selected for access using the FIND command. Otherwise, an error occurs if no record is selected when GET is executed. The flow variable and the field used in the GET statement must be of the same declared type.

An example of the GET command follows:

Retrieving Data from an Array

GET TEMPCHECK AT INDEX USING CHECKS

Retrieving Data from a Local Database

GET TELL_CALLER AT LOC_PROMPT USING LOCATE

12. GETSESSION

The GETSESSION statement allocates a host session to a flow from a specified session pool.

The syntax for the GETSESSION command is as follows:

GETSESSION <session pool>

If the host associated with the SESSION Table entry "session pool" is deactivated or down, the dynamic variable CN$HOSTDOWN is raised; if the host is up and if a session configured in the "session pool" is available, it is allocated to the flow; otherwise CN$FAIL is raised. A flow has to execute a GETSESSION statement successfully before it can use any other host communication statements like PLACE, CAPTURE etc.

An example of the GETSESSION command follows:

GETSESSION CHECKING
ON CN$HOSTDOWN GOTO HOSTDOWN
ON CN$FAIL GOTO NOSESSION

13. GODIAL

The GODIAL statement gives control of the call to VMS.

The syntax for the GODIAL command is as follows:

GODIAL <charvar>

The caller will be treated as a new caller who has entered the mailbox specified as a CHAR variable. The CHAR variable must contain valid DTMF digits. If the first digit of the CHAR variable contains a '#', the caller proceeds through the normal mailbox logon sequence.

An example of the GODIAL command follows:

(1)
  LET ASSISTEXTN='333'
  GODIAL ASSISTEXTN
(2)
  LET USERMBOX='#5930'
  GODIAL USERMBOX
  ON CN$FAIL GOTO INVALID

14. GOFLOW

The GOFLOW statement completes the processing of the flow that is currently being executed an begins the processing of the flow specified.

The syntax of the GOFLOW command is as follows:

GOFLOW <flowname>

An example of the GOFLOW command follows:

GOFLOW ORDERS

15. GOSUB

The GOSUB statement directs the flow to execute the subroutine specified. When the subroutine is completed, it returns and continues at the statement immediately following the GOSUB.

The syntax for the GOSUB command is as follows:

GOSUB <name>

An example of the GOSUB command follows:

GOSUB INITIALIZE

16. GOTO

The GOTO statement transfers control of the flow program to another section of the program specified by a label.

The syntax for the GOTO command is as follows:

GOTO <label>

AN example of the GOTO command follows:

"Reprompt the caller

GOTO ASKAGAIN

17. HANGUP

The HANGUP statement hangs up the VMS port associated with a particular call, freeing it to handle other calls. The flow will continue until an ENDFLOW statement is executed.

The syntax and an example of the HANGUP command is as follows:

HANGUP

18. HOSTRCV

The HOSTRCV statement waits for a screen of data from the host computer.

The syntax for the HOSTRCV command is as follows:

HOSTRCV

An example of the HOSTRCV command follows:

HOSTRCV
ON CN$FAIL GOTO HOSTTIMEOUT

19. HOSTSND

The HOSTSND statement sends a screen of data to a host computer.

The syntax for the HOSTSND command is as follows:

HOSTSND [aid]

Aid is an attention identifier terminal key sent to the host to request an action. The specific aid to be used is the same key that the terminal operator would press to perform the function and is dependent upon the host application. ENTER is the default key that is used if one is not specified. The valid keys are:

| Aid Key | Function |
| --- | --- |
| ENTER | Processes the screen. (Send the ENTER key). |
| CLEAR | Send the CLEAR key |
| ATTN | Send the ATTN key |
| PF1 through PF24 | Programmable function keys. (application dependent) |
| PA1 through PA3 | Programmable function keys. (application dependent) |

An example of the HOSTSND command follows:

(1) HOSTSND ENTER
(2) HOSTSND PF11 HOSTRCV

20. IF

The IF statement compares two variables or compares a variable with a constant. The comparison operators allowed are:

| Equal | = |
| --- | --- |
| Not equal | <> |
| Greater than | > |
| Less than | < |
| Greater than or equal to | ≥ |
| Less than or equal to | ≦ |

The IF statement is immediately followed by a THEN GOTO label statement. The flow will transfer to the label if the comparison is accurate.

The syntax for the IF command is as follows:

IF <variable> {=, <>, >, <, <=, >=} <variable>
THEN GOTO <label>
IF <variable> {=, <>, >, <, <=, >=} <constant>
THEN GOTO <label>

The variable or constants in the comparison must be of the same type. For comparisons of CHAR types, the ASCII values of the first characters that differ in the variables are used in the comparison. Also, if the current length of the variables is different, but all characters are the same up to the length of the shorter string, the shorter string is considered less than (<) the longer string. When comparing NUM variables of different significance, all significance is used.

An example of the IF command follows:
(1)
  IF ENTRDPSS='HOSTPSS'
  THEN GOTO GOODPASS
(2)
  IF ACNTBAL <=0
  THEN GOTO OVERDRWN
(3)
  LET A=3.1
  LET B=3.10001
  "Following will fail, A<B succeeds
  IF A=B
  THEN GOTO ABEQUAL

21. INPUT

The INPUT statement accepts DTMF input from the person who is currently connected to the flow. The input can be placed in either a NUM or CHAR variable.

The syntax for the INPUT command is as follows:

INPUT <numvar> RANGE <numeric> TO <numeric>
INPUT <charvar> LENGTH <numeric> TO <numeric>

In the first example, the command reads numeric input from the DTMF keypad and places it in the NUM variable, verifying that the value is in the specified range. The second command is for inputting data into a CHAR variable, checking to assure that the length of the string entered is valid. There are system configuration parameters that can be set that affect how INPUT is handled. These include:

Whether "#" is required to terminate input.
Whether "*" should be used for a decimal point, a negative sign, or both on numeric input. (E.g.: "*" "0", "*", "3", "5" would be −0.35).
The number of seconds to wait for a character to be entered before setting CN$TIMEOUT.
The number of successive timeouts before setting CN$TMOLIMIT
The number of successive invalid inputs before setting CN$INVLIMIT.

An example of the INPUT command follows:
(1) INPUT WRAPUP RANGE 0 TO 99999
(2) INPUT VISANUM LENGTH 16 TO 16

In example two, VISANUM is declared as a CHAR variable because it is too large to store as a NUM variable.

22. LET

The LET statement assigns a new value to a variable. The value assigned can be:

A constant.
The result of an arithmetic operation involving either two variables or a constant and a variable.
A variable.
A run-time variable.
A prompt.

The syntax for the LET command is as follows: LET assigns a value to either a CHAR variable, a NUM variable, or a PROMPT variable.

(1) LET <numvar> = <numvar> {+,−,*,/} <numeric>

NUM variables can be assigned a numeric constant, or be the result of an arithmetic operation involving variables or a variable and a constant.

(2) LET <numvar> = <numvar> MOD <numeric>

NUM:0 variables are divided to create a remainder.

(3) LET <numvar> = − <numeric>

The minus sign (−) can also be used to negate a value.

(4) LET <charvar> = <charvar> CONCAT {charvar, character}

(5) LET <charvar> = {LEFTJUST, RIGHTJUST, UPPER, LOWER} <charvar>

String operators (CONCAT, LEFTJUST, RIGHTJUST, UPPER, LOWER) are valid only on CHAR variables. The CONCAT operator works on two CHAR variables, or a CHAR variable and a constant. The other four operators take a single CHAR variable as the operand.

(6) LET <charvar> = SUBSTR <charvar, numeric, numeric>

The SUBSTR string operator extracts a string from a CHAR variable, where the string is specified by a numeric offset and length respectively. The offset starts at 1 for the first character in the source string.

(7) LET <variable> = {LENGTH, MAKENUM, MAKECHAR} <variable>

This construct is used for mixed mode operations, where an operation is performed on a variable of one type and the result is of a different type. MAKENUM and LENGTH take a CHAR operand with the result being a NUM, while MAKECHAR takes a NUM operand and generates a CHAR result. A blank or empty CHAR operand has a value of 0. IN the following example, the value 0 is stored in NUM_RESULT:
  LET EMPTY_STRING="
  LET NUM_RESULT=MAKENUM EMPTY_STRING (8) LET <prompt> = <promptname>

This form assigns a prompt identifier to a PROMPT variable. This may be required when it is necessary to speak a series of prompts that have been determined by caller input.

(9) LET <variable> = <XX$variable> [for tablename]

Assigns the value of a dynamic run-time variable to a flow variable. The XX can either be SY, CL, HT, FL, or DB. When using DB, the portion must be included to identify the local data table, with tablename being an entry in the Configuration Tables.

An example of the LET command follows:
Reassigning values to variables
(1) LET ERRFIELD='ERROR'
(2) LET VALUE=99.999
(3) LET ACCOUNT=MAKENUM BALANCE
  Assigning the result of an arithmetic operation
(4) LET I=I+1
(5) LET INTEREST=ACCOUNT * 0.065

Assigning a remainder
(6) LET STOCK_LEFT=TOTAL_SHARES MOD SHARES_PER_BLOCK
Assigning a negative value
(7) LET NEGBAL=−BAL
Appending a string of characters
(8) LET FULLNAME=FIRST CONCAT LAST
Converting a character value to a numeric value
(9) LET SELECTION=MAKENUM ITEMNUM
Extracting a substring from a string
(10) LET MIDDLE=SUBSTR (LONGSTRING, 10, 10)
Assigning a prompt name to a prompt variable
(11) LET GREET=OFFHOURS
Assigning a dynamic run-time variable to a numeric variable
(12) LET SYSDAY=SY$DAY

23. MENU

The MENU statement branches to a choice of labels based on the caller's single-digit input.
The syntax for the MENU command is as follows:
MENU
ON [X] ...
ON [Y] ...
ON [Z] ...
GOTO ...

The MENU statement includes all of the following ON statements as part of the MENU. If them is no corresponding ON statements for the character input, or the user entered invalid input, the flow continues sequentially with the following statement, which is the GOTO TRYAGAIN in the example below.
An example of the MENU command follows:
MENU
ON CN$TIMEOUT GOTO REPROMPT
ON [0] GOTO LAB0
ON [1] GOTO LAB1
ON [*] GOTO LABSTAR
ON [#] GOTO LABPND
GOTO TRYAGAIN

24. ON

The ON statement handles conditions that can occur during execution of a flow. It is also used to check for a specific DTMF digit as part of the MENU command.
The syntax for the ON command is as follows:
(1) ON [{0,1,2,3,4,5,6,7,8,9,*,#,A,B,C,D}] GOTO <label>
(2) ON [{0,1,2,3,4,5,6,7,8,9,*,#,A,B,C,D}] GOSUB <subroutine>
(3) ON CN$condition GOSUB <subroutine>

Syntax statements 1 and 2 show the syntax after a MENU command. The characters A. B, C, D refer to DTMF tones, and not to keys on the phone. Brackets [] are required to surround the menu choices in this usage of the ON command. Syntax statements 3 and 4 show the usage of ON to handle a condition. The syntax in statement 4 is used only in the COMMANDS section of flow; it cannot be used in the DEFAULTS section.
An example of the ON command follows:
(1) ON [1] GOTO FIRSTCHOICE
(2) ON CN$FAIL GOTO ASSIST

25. PLACE

The PLACE statement places the contents of a variable onto a host screen.
The syntax for the PLACE command is as follows:
PLACE <charvar> AT <field> ON <screen>
PLACE puts the value of a CHAR variable or constant onto a screen field. The screen and the field in which to place the variable are identified by their names as specified in the SCREEN Table.
An example of the PLACE command follows:
PLACE ITEMNUM AT ITEMPOS ON SCREEN 1

26. PUT

This command places data in arrays or into a local database record.
The syntax for the PUT command is as follows:
PUT <value> AT <index> USING <arrayname>
Values declared as arrays are only used in the PUT and GET flow statements. The value must have the same data type as the array.
Value can be:
A numeric constant.
A character constant.
A NUM variable name.
A CHAR variable name.
The index value must be:
A NUM:0 variable name.
An integer constant.
The index value can be a variable or an integer constant. In either case, the index must be a positive non-zero value that is less than or equal to the maximum number of elements declared for the array. If <index> is a variable, it must be declared as a NUM:0.
Placing data into a local database
PUT <variable> AT <field> USING <database>
The flow variable and the field used in the PUT statement must be of the same declared type. PUT places the contents of the flow variable into the specified field using the currently selected record of the database. A database record is selected for access using the FIND command. An error occurs if no record is selected when PUT is executed. PUT places the variable into the database record, but the database is not updated until the record is written onto disk using the WRITEDB command. A PUT operation to an index field is not allowed.
An example of the PUT command follows:
Placing data in arrays
PUT TEMPCHECK AT INDEX USING CHECKS
Placing data in local database
FIND NEW RECORD USING SAVEINFO
ON CN$FAIL GOTO FULLDATABASE
PUT REQUEST AT REQ_ITEM USING SAVEINFO
PUT MSG_NUMBER AT SAVE_MSG ;USING SAVEINFO
WRITEDB RECNUM SAVEINFO

27. RECORD

Records a new message or records a message at the end of an existing message. Flow execution continues when the recording terminates.
The syntax for the RECORD command is as follows:
Recording a new message
RECORD <numvar> NEW
Where <numvar> is the message ID and is a variable of type NUM:0. The <message id> is returned for subsequent use, after the statement is executed. However, subsequent RECORD NEW statements are illegal until the message is explicitly saved or erased using SAVE or ERASE. No other prompt can access the message until a SAVE statement is executed. If a new message is outstanding at ENDFLOW, it is automatically erased, and an error is logged.
Appending a message
RECORD <numvar> APPEND Where <numvar> is the message ID of type NUM:0 and must have been previously used in a RECORD NEW statement. This message identifier can be used in ERASE, SPEAK, SEND, and SAVE statements. The message is recorded at the end of the existing message specified by the message ID. All messaging access by other channels to this message is locked out while RECORD ... APPEND is in progress.

An example of the RECORD command follows:
RECORD CUSTMSG NEW
ON CN$FAIL GOTO NOMSG
RECORD CUSTMSG APPEND

28. RETURN

The RETURN statement directs the flow to exit from the subroutine and to continue execution at the statement immediately following the GOSUB that called the subroutine. An ENDSUB statement does an implicit RETURN.

The syntax for the RETURN command is as follows:
RETURN

An example of the RETURN command follows:
RETURN

29. SAVE

The SAVE statement allows a message created with RECORD NEW to be stored internally for access by a subsequent flow. After a RECORD NEW statement, the message created is considered "open." The message must be saved or erased (by using the SAVE or ERASE command) before the end of the flow. Otherwise, the message is automatically erased and a User Error is logged. The SAVE statement is valid only once for the message created by the RECORD NEW statement within the flow. In order for other flows to access a message, the following two steps are necessary:
(1) PLACE <numvar> on the host screen and send it to the host, or WRITEDB the <msgid> to the local database.
(2) SAVE <numvar> only after successful HOSTSND or WRITEDB.

The syntax for the SAVE command is as follows:
SAVE <numvar>

Where <numvar> is the message ID of the variable type NUM:0 that must have been previously used in a RECORD statement. This message identifier can be used in ERASE, SPEAK, SEND, and SAVE statements.

An example of the SAVE command follows:
SAVE CUSTMSG

30. SELECT

The SELECT statement is used to gain access into a local database. A database must be SELECTed before an FIND, GET, or PUT commands are introduced in the flow program.

The syntax for the SELECT command is as follows:
SELECT <database>

Where <database> must be the name of a database defined in the Local Data Table

An example of the SELECT command follows:
SELECT TRAVEL
ON CN$FAIL GOTO RECORDS_NT_AVAIL

31. SEND

This command sends a message to a destination mailbox. The message is marked as having been sent by the creator mailbox, allowing a reply or error message to automatically return to the creator as specified. If no creator is specified, the creator defaults to the error mailbox configured on VMS. The destination mailbox can be a network address. Unless explicitly ERASEd, the message remains available after SEND is executed.

The syntax for the SEND command is as follows:
SEND <numvar> TO <mbox> [FROM creator]

Where <numvar> is the message ID and is a variable declared NUM:0 that has a message identifier set tip by a previous RECORD command. The destination mailbox for the message must be specified as a CHAR variable. If the optional creator mailbox is specified, a reply or failure is directed to the creator mailbox. Otherwise, the system error mailbox specified on VMS is used as the default creator. The creator mailbox must be specified as a CHAR variable.

An example of the SEND command follows:
(1)
RECORD CUSTMSG NEW
TRANSLATE AGENTCODE TO AGENTMBOX USING AGTABLE
SEND CUSTMSG TO AGENTMBOX
ERASE CUSTMSG
(2) SEND INQUIRE TO SVCMBOX FROM GUESTBOX

31. SPEAK

The SPEAK statement relays information to the person connected to the flow.

The syntax for the SPEAK command is as follows:
(1) SPEAK <variable> [AS <speaktype>]
(2) SPEAK <promptname> [AS PROMPT]

SPEAK is used to output a variable or a prompt to the caller or agent. A variable may be spoken in a variety of speaktypes which are described below. If no speaktype qualifier is specified, a default is chosen based upon the type of the variable.

| Speaktype | Definition |
| --- | --- |
| MONEY | The value 100.35 would be spoken as "One hundred dollars and thirty-five cents." Valid only on NUM variables. |
| DIGITS | All alphanumeric characters (A-Z and 0-9) are spoken as individual characters. The value 100.35 would be spoken as "One zero zero point three five." The value 'HELLO' would be spelled out as 'H-E-L-L-O'. DIGITS is the default speak type for CHAR variables. Valid for all NUM and CHAR variables. |
| NUMERIC | The value 100.35 is spoken as "One hundred point three five." This is the default for NUM variables and is only valid for NUM variables. |
| MONTH | The variable must be a NUM:0 type and have a value in the range 1012. For example, the value 3 would be spoken as "March." |
| DAY | The value must be a NUM:0 type and have a value in the range 1-7. For example, the value 3 would be spoken as "Tuesday." |
| PROMPT | The variable contains a prompt identifier previously assigned via a LET or TRANSLATE statement. This is the default value and the only allowable speak type for PROMPT variables. |
| MESSAGE | The variable contains a message identifier previously set using RECORD. Only valid for NUM:0 variables. |
| DTMF | The value is outpulsed as a DTMF string. The variable must a CHAR type and contain valid DTMF |

-continued

| Speaktype | Definition |
|---|---|
| | characters. |

An example of the SPEAK command follows:

| (1) | SPEAK BALANCE AS MONEY |
|---|---|
| (2) | NUM:5 VALUE |
| . | |
| . | "Default speaktype is numeric when not specified |
| | SPEAK VALUE |
| (3) | SPEAK AGNTMSG AS MESSAGE |

32. STARTSUB

STARTSUB is the first statement in a subroutine. It identifies the subroutine's name. Each subroutine must have one STARTSUB statement.

The syntax for the STARTSUB command is as follows:

STARTSUB <name>

Name identifies the subroutine's name.

An example of the SUBROUTINE follows:
STARTSUB INITIALIZE

33. TRANSFER

The TRANSFER statement puts the current caller on hold and calls the mailbox or extension specified. Call progress is monitored. If TRANSFER succeeds, the CONNECT statement is required to complete the transfer. Either the standard or alternate transfer codes are selected, based on the INFORMATION Table used. The INFORMATION Table corresponds to the mailbox or to the port if the variable specified does not contain a valid mailbox.

The syntax for the TRANSFER command is as follows:

TRANSFER <charvar>

If the variable specified contains a valid VMS mailbox, the mailbox extension is used. Otherwise, the extension number contained in the variable specified is used. The extension number must contain valid DTMF characters.

An example of the TRANSFER command follows:
LET ASSISTEXT='300'
TRANSFER ASSISTEXT

34. TRANSLATE

The TRANSLATE statement is used to convert one data value to another using a TRANSLATION Table. A previously defined TRANSLATION Table is searched to see if it contains the particular statement's value in a variable. If so, the table entry for that variable is assigned to a new variable.

The syntax for the TRANSLATE command is as follows:

TRANSLATE <search_var> TO <return_var> USING <tablename>

In the above statement, the first variable contains the data that will be translated to a new value and placed in the second variable based upon the contents of the table specified by the tablename. The search and return variables must match their corresponding types in the specified table. Table name must be previously defined in the TRANSLATION Table using the configuration applications terminal software.

An example of the TRANSLATE command follows:
TRANSLATE ITEMNUM TO ITEMPRMP USING ITEMTBL

35. WAIT

The WAIT statement delays execution of the flow program until the number of specified second has elapsed. The maximum time is 65535 seconds.

The syntax for the WAIT command is as follows:
WAIT <numeric>

Numeric is either a NUM:0 variable or a constant that specifies the number of seconds to delay before reactivating the flow program.

An example of the WAIT command follows:
LOOP:
  TRANSFER AGEXT
  ON CN$FAIL GOTO DELAY
  CONNECT
  GOTO END
DELAY:
  SPEAK PLSHOLD PROMPT
  WAIT 30
  GOTO LOOP

36. WRITEDB

The WRITEDB statement is used to output the currently selected record to the local database file and then returns the written record number.

The syntax for the WRITEDB command is as follows:
WRITEDB <numvar> <database>

After a record is output to the file, the flow no longer has a selected record for the database and must do another FIND before any PUT or GET commands can be executed. The record number for the record just written is returned in an integer variable <numvar> specified in the WRITEDB command. This variable must be a NUM:0 variable.

Figure 4:
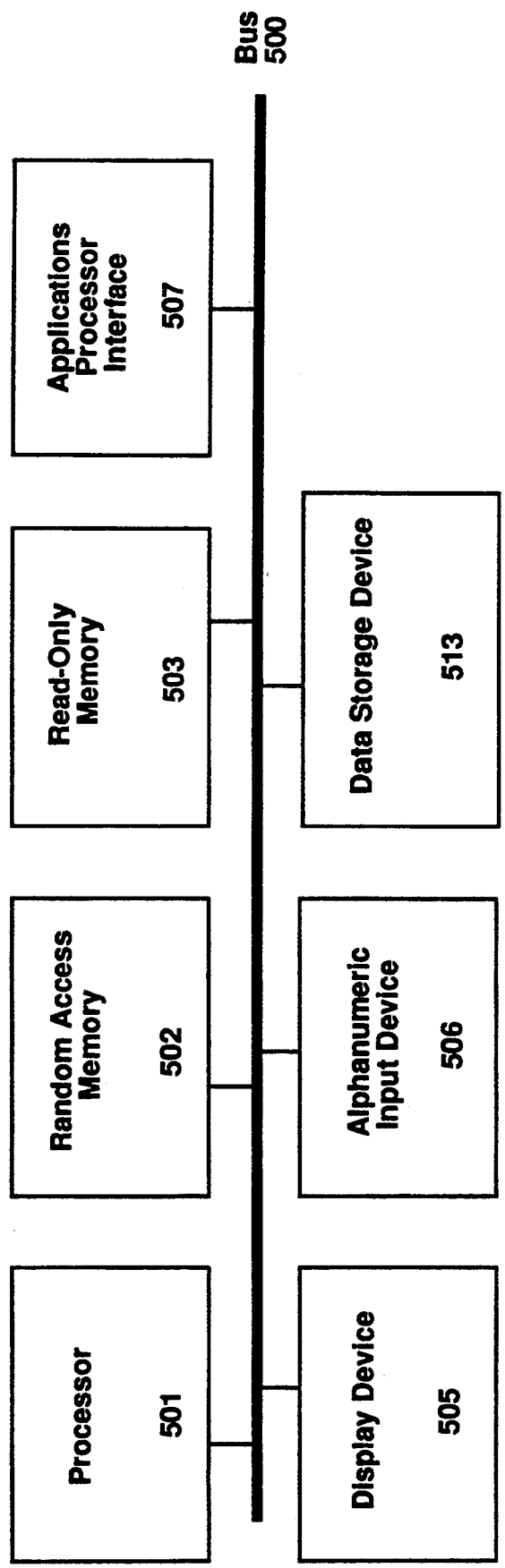
FIG. 4 illustrates a typical architecture of the configuration applications terminal of the present invention.

An example of the WRITEDB command follows:
PUT REQUEST AT REQ_ITEM USING SAVEINFO
PUT MSG_NUMBER AT SAVE_MSG USING SAVEINFO
WRITEDB RECNUM SAVEINFO
ON CN$FAIL GOTO SORRY The Configuration Applications Terminal (CAT) 112 is a computer used to configure the operation of the applications processor 110 and its associated call flows. In general, the CAT 112 has several functions: 1) to perform terminal emulation for communication with the applications processor 110, 2) to backup and restore system configuration tables and application-specific tables, 3) to backup and restore local databases, 4) to to transfer a call flow program for off-line editing, and 5) to update applications processor system software. A typical architecture of the configuration applications terminal 112 is shown in FIG. 4.

Terminal emulation allows the CAT to communicate with applications processor 110 directly through a cabled connection or remotely through a modem. Characters typed on the CAT keyboard are sent to applications processor 110, and information from applications processor 110 is displayed on the CAT monitor. The only time the CAT is not performing terminal emulation is when menus are displayed. At this time, communication with applications processor 110 is temporarily suspended because the menus control the terminal.

The CAT uses a packet-based, error-correcting data transfer protocol at speeds up to 19200 baud to pass information between applications processor 110 and the CAT. Data transfer is initiated by menu selection and is performed by software residing in the CAT. This CAT software includes a Backup function, a Restore function and an Update function. The Backup function transfers data from applications processor 110 to the CAT hard disk drive 113. The Restore and Update options transfer data from the CAT hard disk drive 113 to Applications processor 110.

The CAT software also includes utilities to manage individual applications processor system configurations. System configurations, including the content of system configuration tables and application specific tables, can be added, deleted, and modified. Backed-up system configurations can be archived to and recovered from a floppy diskette.

The CAT software also includes utilities to manage log files, which capture communication sessions from applications processor 110. Multiple log files can be stored, displayed printed, and deleted for each applications processor 110 system configuration defined within the CAT software.

OPERATION OF THE PRESENT INVENTION

Figure 8:
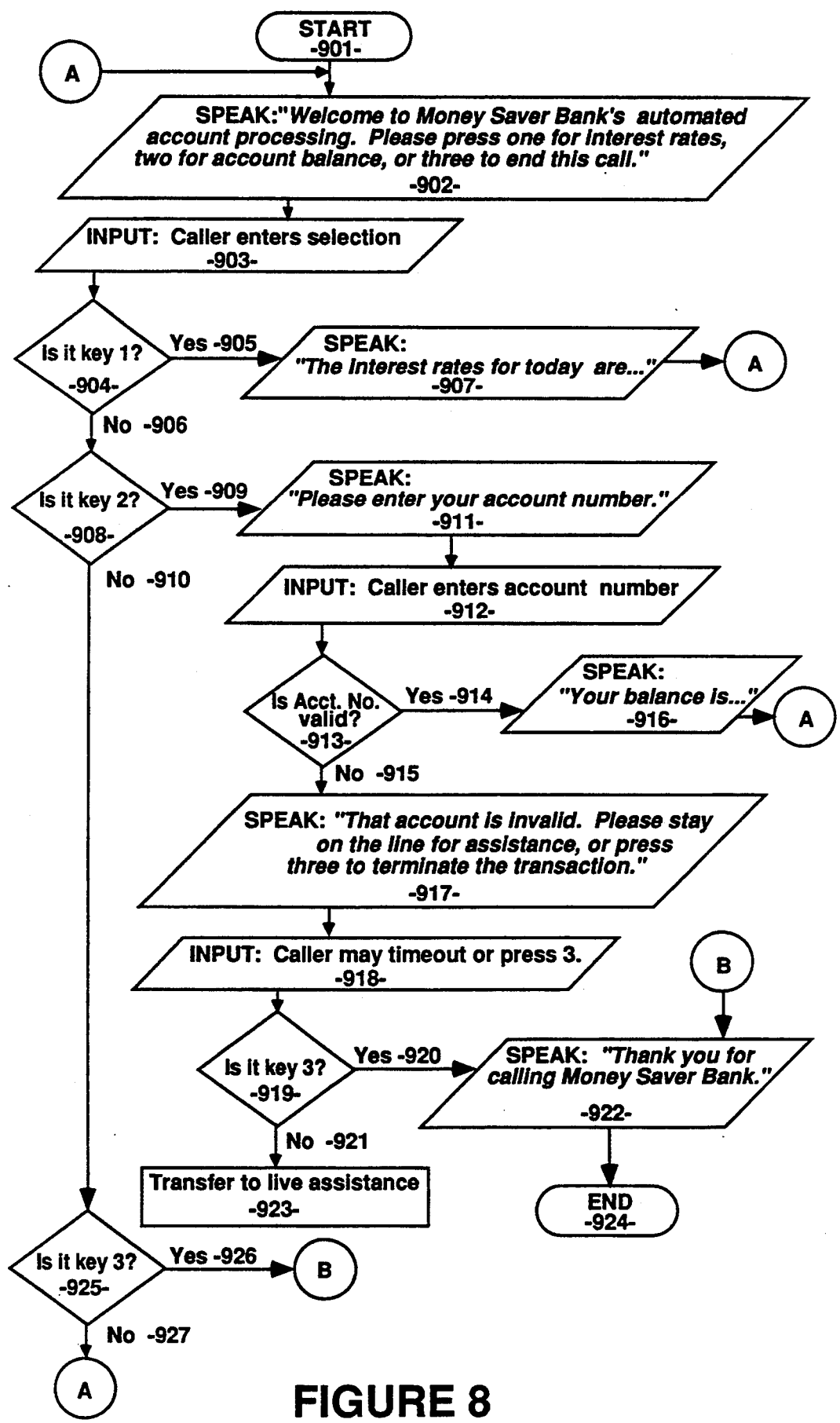
FIGS. 8-10e are flow charts illustrating examples of call flow applications serviced by the preferred embodiment.

In order to illustrate the hardware and the call flow language processing logic of the present invention, three examples of the operation of the preferred embodiment are described herein and illustrated in FIGS. 8, 9a-9f and 10a-10e. Referring to FIG. 8, a sample application processing flow chart is illustrated. The application processing flow illustrated in FIG. 8 represents a flow program activated and executed by applications processor 110 in response to an incoming telephone call received from VMS 105 in the manner described above. Once the application flow is initiated, processing flow begins at bubble 901. Initially, an announcement message is audibly transmitted to the caller using the SPEAK command of the call flow language (processing box 902). Hardware means for recording, and playing back audible speech is an apparatus well known in the art. The announcement message spoken or transmitted to the caller in processing box 902 includes a menu of options provided for the caller and a prompt for the operator to enter one of the options provided. Options are entered by a caller using the numeric keypad buttons on the telephone handset. These buttons generate dual tone multi-frequency (DTMF) signals which can be used to distinguished the various options entered by a caller. The technique of using DTMF signals is well known in the art. Once the caller is prompted by a message in processing box 902, an INPUT command is executed by applications processor 110 in order to retrieve the caller's selection (processing box 903). If the caller fails to enter a selection within a predetermined timeout period, execution control returns to processing box 902 where the menu and prompt message is again transmitted. If the caller enters a 1 key on the telephone handset (decision box 904), processing path 905 is taken to processing box 907. Since the entry of a 1 key is associated with a request for interest rates in the example of FIG. 8, another SPEAK command is executed to announce the current interest rates as retrieved from an internal database using the SELECT, FIND and GET commands. Once the SPEAK command is executed in processing box 907, processing flow continues at the bubble labeled A where the announcement message, the menu and prompt are again spoken in processing box 902.

If the caller enters key 2 (decision box 908), the example of FIG. 8 processes a request for an account balance. First, the caller is prompted to enter his account number (processing box 911) the caller enters the account number using the telephone keypad. An INPUT command is executed to retrieve the account number entered by the caller (processing box 912). Once an account number is received from the caller, the account number is validated in decision box 913. The caller-entered account number may be invalid for several reasons. First, an inappropriate quantity of numbers may have been entered. Secondly, the entered account number is used with a FIND command in order to access a database containing valid account numbers. If the caller-entered account number is not found or is inaccessible to the caller, the account number is rendered invalid. For an invalid account number (processing path 915), a message is spoken to the caller stating that the account is invalid and prompting the caller to enter a selection corresponding to a subsequent action to be taken (processing box 917). An INPUT command is then executed to retrieve the selection made by the caller for an invalid account number (processing box 918). If the user enters a 3 key (decision box 919), a termination message is spoken to the caller (decision box 922), and the call flow processing logic of FIG. 8 is terminated at termination box 924. If the user does not enter a key 3 at decision box 919, the call is transferred to a live personal representative at processing box 923 where the call is handled manually and without further control by the call flow logic of FIG. 8. The call is transferred to live assistance in processing box 923 by execution of the TRANSFER command and the CONNECT command.

If at decision box 913 a valid account number is entered (processing path 914), another SPEAK command is executed to audibly convey to the caller the current balance of the account number entered earlier (processing box 916). The account balance is retrieved from an account database using the SELECT, FIND, and GET commands. Once the account balance is spoken to the caller at processing box 916, processing loops back to processing box 902 through the bubble labeled A in FIG. 8.

Referring back to decision box 908, if the number 1 key or the number 2 key are not depressed by the caller in response to the prompt in processing box 902, processing path 910 is taken to decision box 925. If the caller enters the 3 key (processing path 926), processing control is transferred to the bubble labeled B where the call is terminated with a termination message (processing box 922). If the 3 key is not depressed or a timeout occurs, processing again transfers to the bubble labeled A as shown in FIG. 8. Thus, a means for handling an incoming call using the applications control hardware and call flow language processing logic of the present invention is illustrated in this first example. A script for handling an incoming call as in this first example is presented in LISTING A appearing just before the claims section of this patent application.

A second example of the operation of the present invention is illustrated in FIGS. 9a through 9f. FIGS. 9a through 9f illustrate the call flow processing logic for handling service calls made to a help desk. In this application, callers with problems or questions call a general help number in order to resolve their questions. The present invention serves to facilitate fast and effective communication between callers with problems and the specialists who can help them. In addition, the present invention automatically manages and tracks information about the problems presented by the callers and the results or answers provided to them by organization specialists. In a help desk application, prior art systems are unable to effectively handle the wide array of caller problems and questions placed to a single help line telephone number. With the present invention, however, the help desk application is efficiently automated as illustrated by the logic in FIGS. 9a through 9f.

Figure 9A:
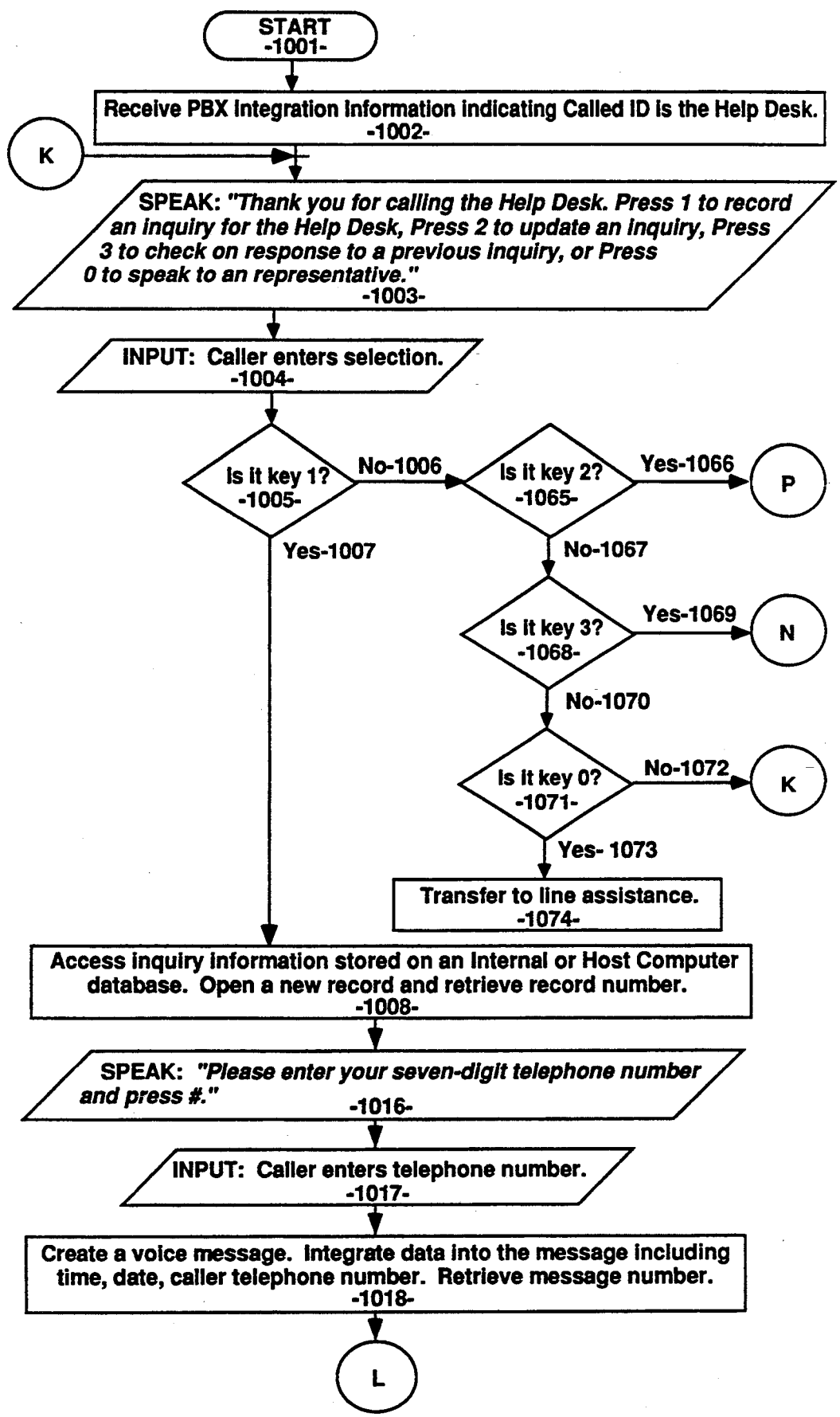

Referring now to FIG. 9a, the call flow for the help desk application of the second example is illustrated. After the call flow is initiated in the matter described earlier, processing begins at bubble 1001. Using integration information received from PBX 100 and VMS 105, applications processor 110 determines that the called ID is that of the help desk (processing box 1002). Using the SPEAK command, an initial announcement message, a menu of options, and a prompt message is spoken to the caller (processing box 1003). The caller selection is then received (processing box 1004) using the INPUT command. Depending upon the key entered by the caller, one of several possible processing paths are taken. For example, for the entry of key 1 on the telephone keypad, processing path 1007 is taken to processing box 1008. In this second example, key 1 is associated with a request by the caller to record an inquiry for the help desk. If the caller enters key 2, processing path 1066 is taken to the bubble labeled P illustrated in FIG. 9f. In this second example, key 2 is associated with a request by the caller to update an inquiry already existing from a previous transaction with the help desk. If the caller enters key 3 on the telephone keypad, processing path 1069 is taken to the bubble labeled N illustrated in FIG. 9e. In this second example, key 3 is associated with a request by the caller to check on a response to a previous inquiry made to the help desk. If the zero key is entered by the caller, processing path 1073 is taken to processing box 1074 where the call is transferred to a live representative for further manual call processing. If a key other than keys 0 through 3 is entered or if a timeout occurs, processing path 1072 is taken to the bubble labeled K illustrated in FIG. 9a where the initial announcement message, menu and prompt messages are repeated (processing box 1003).

Starting at processing box 1008 shown in FIG. 9a, call processing in response to the operator selection of key 1 is illustrated. Processing started at processing box 1008 handles a caller request for recording a new inquiry for the help desk. In order to accomplish this task, an inquiry database is accessed using the SELECT command. A new record is opened in the inquiry database using the FIND NEW construct of the FIND command. A PUT command followed by a WRITEDB command is used to initialize the new record and to produce a record number associated with the new record (processing box 1008). Once a new inquiry record is initialized in processing box 1008, the SPEAK command is used to prompt the caller to enter a seven digit telephone number (processing box 1016). The INPUT command is then used to retrieve the telephone number entered by the caller (processing box 1017). At processing box 1018, a new voice message is created for recording an inquiry by the caller. The RECORD NEW command construct of the call flow language can be used for this purpose. Information such as time, date, caller telephone number, etc. can be integrated or recorded into the new message using the RECORD command. The RECORD command returns a message number associated with the new message for use in later call flow processing. Processing then continues at the bubble labeled L in FIG. 9b.

Figure 9B:
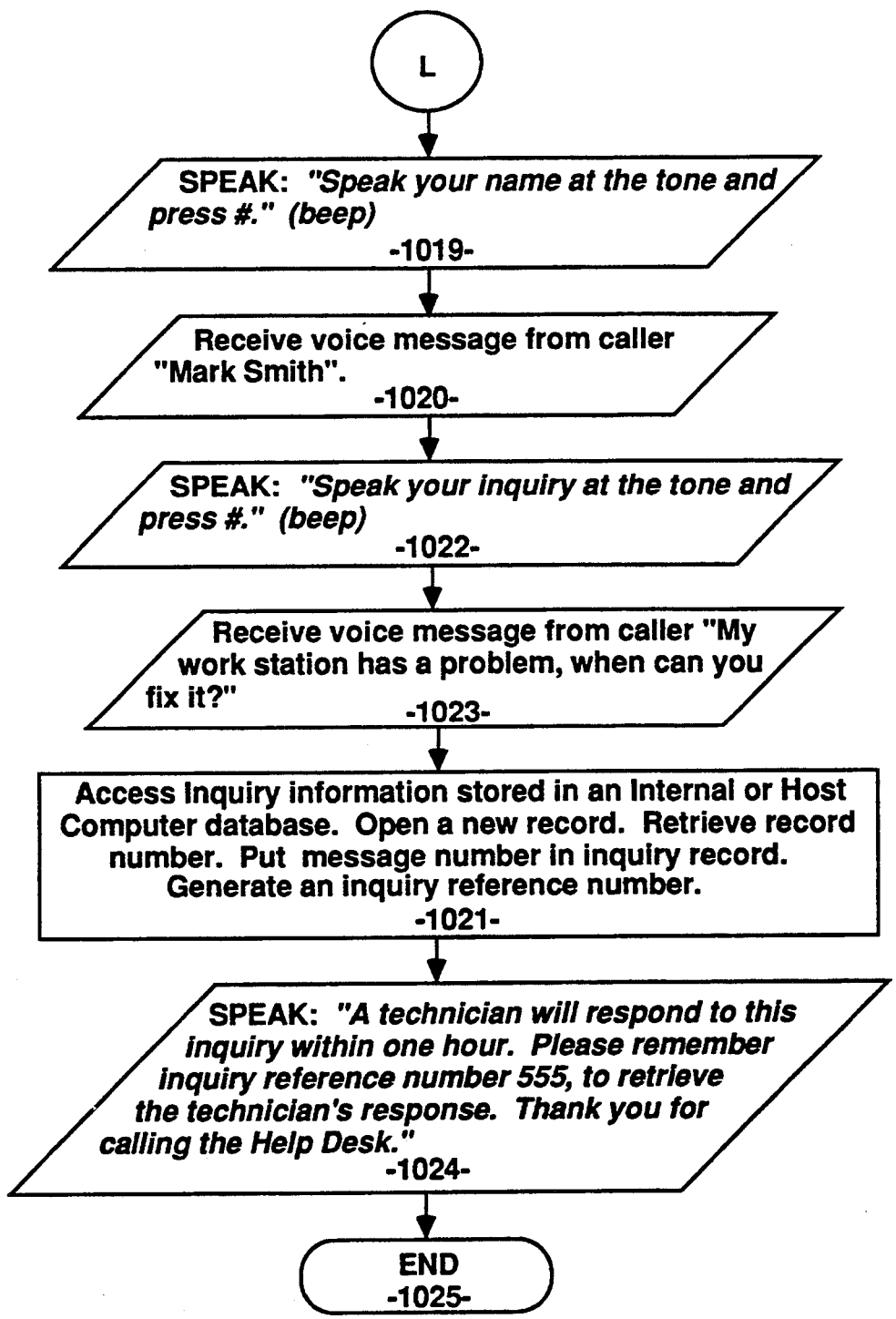

Referring now to FIG. 9b, call flow processing for a help desk application of the second example continues. Having created a new message for recording the caller's inquiry, the SPEAK command is used to prompt the caller to speak his/her name for recording into the new message (processing box 1019). The name of the caller is recorded into the new message at processing box 1020. Next, the SPEAK command is again used to prompt the operator to enter hisser inquiry at the tone and to terminate his/her inquiry by pressing the pound (#) key (processing box 1022). The RECORD command is again used to receive a voice message from the caller, the content of which represents hisser inquiry to the help desk (processing box 1023). After receiving the caller's name and inquiry, a technician database is accessed using the SELECT and FIND commands. A new record in the technician database is opened using the FIND NEW command construct. Once the new record in the technician database is created, the message number associated with the message used to receive the caller's name and inquiry is posted to the new record in the technician database using the PUT command. A unique inquiry reference number associated with the caller's inquiry is generated and put into the technician database along with the associated message number (processing box 1021). Using the RECORD command, a new message is generated which integrates the inquiry reference number into a termination message to the caller (processing box 1024). Call flow processing for the new inquiry then terminates at termination box 1025.

Figure 9C:
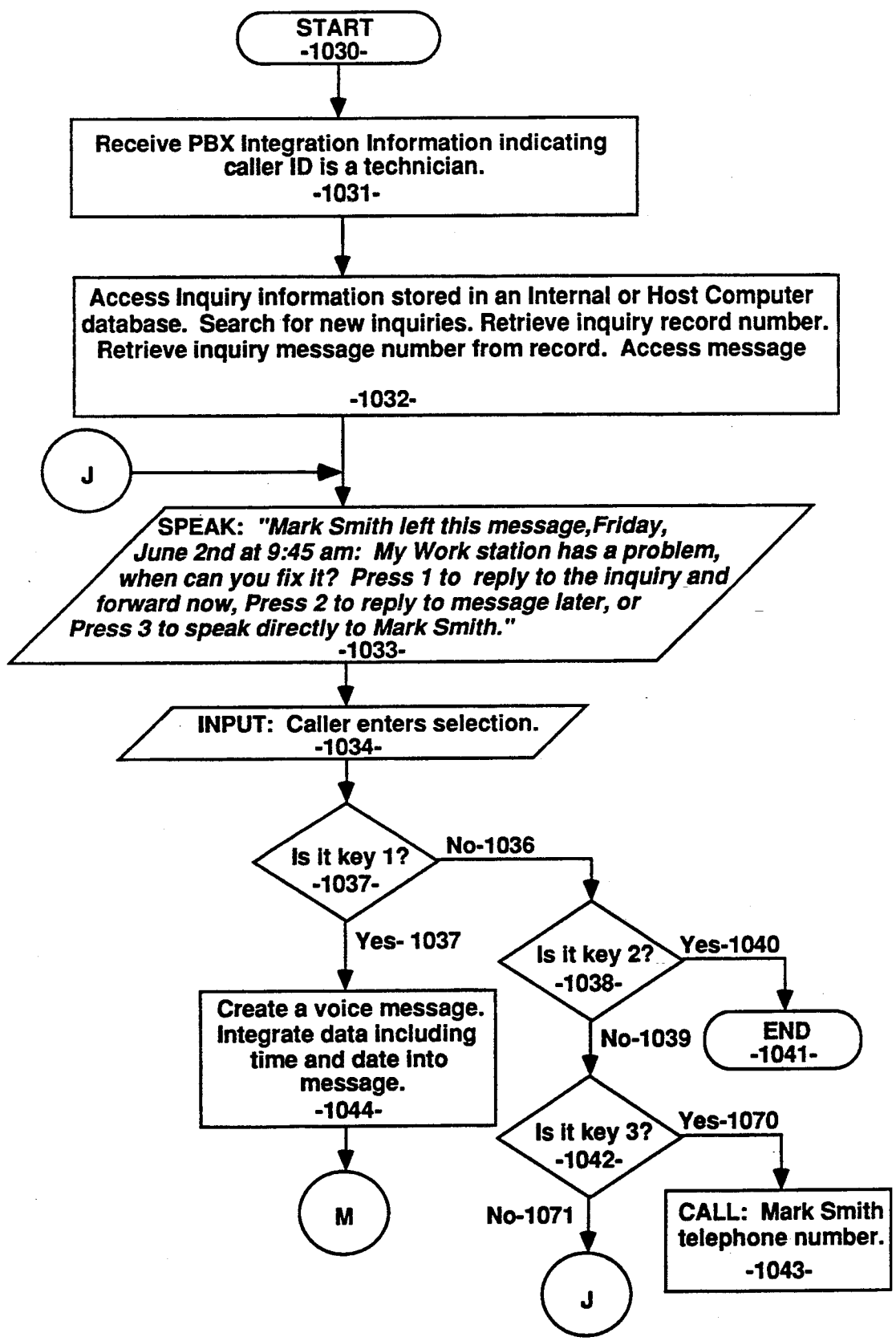
Figure 9D:
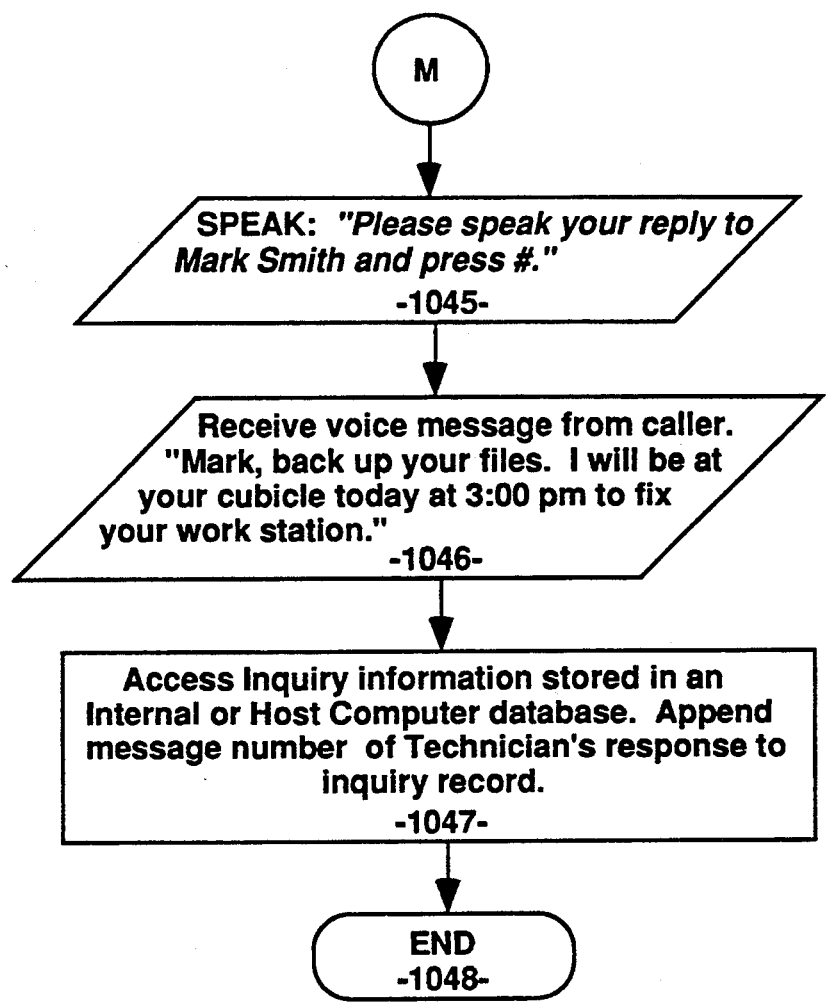

Referring again to FIG. 9a, an inquiry update request is specified if a caller depresses key 2 of the telephone keypad (processing path 1066). In this case, call flow processing passes to the bubble labeled P as illustrated in FIG. 9f. Referring now to FIG. 9f, call flow processing for updating an existing inquiry is illustrated. First, the SPEAK command is used to prompt the caller to enter the existing inquiry number (processing box 1057). The INPUT command is used to retrieve the inquiry number entered by the caller (processing box 1058). Next, the inquiry database is accessed using the SELECT command and the FIND command. The inquiry message number associated with the inquiry reference number entered by the caller is retrieved (processing box 1061). The SPEAK is then used to prompt the caller to enter the inquiry update (processing box 1060). The RECORD command is used to record the update to the inquiry (processing box 1059). The RECORD APPEND command construct can be used to append a new message onto an existing message. In addition, data such as 'time, date, and caller ID can be integrated into the message. Once the caller completes the inquiry update, flow processing continues at bubble K illustrated in FIG. 9a. At bubble K, the initial announcement message, menu of selections, and prompt to enter a selection is again spoken to the caller.

Figure 9E:
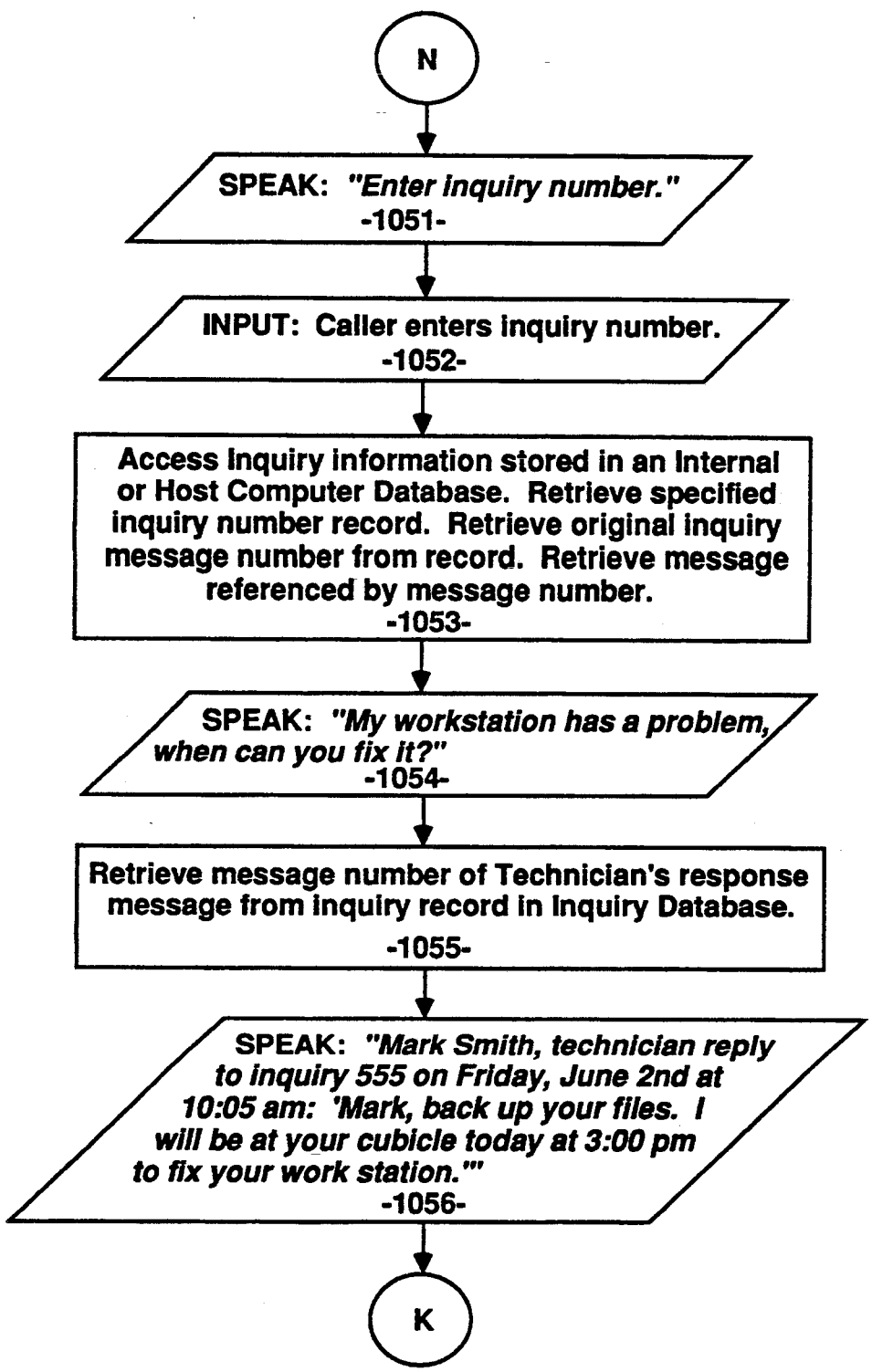
Figure 9F:
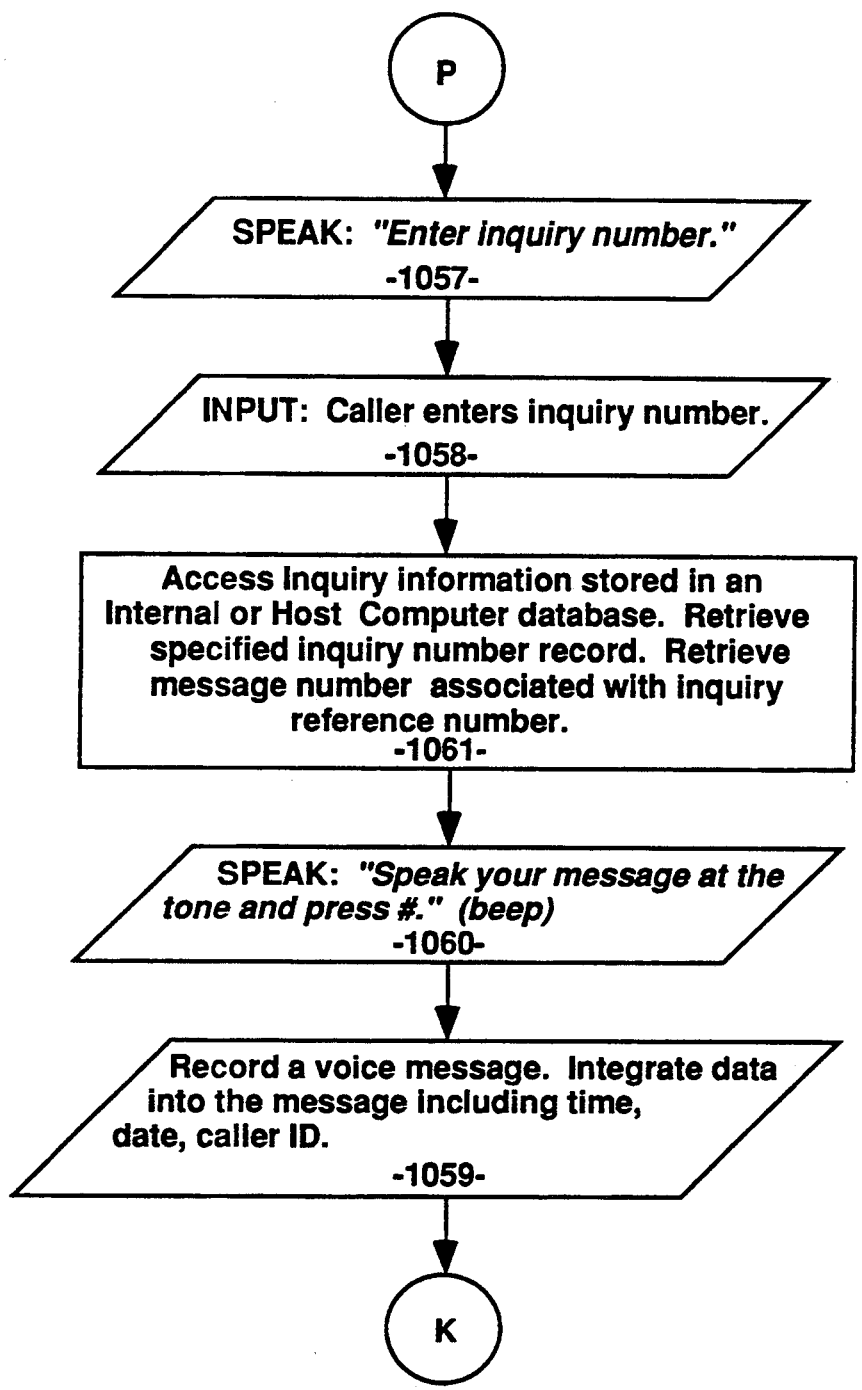
Figure 10A:
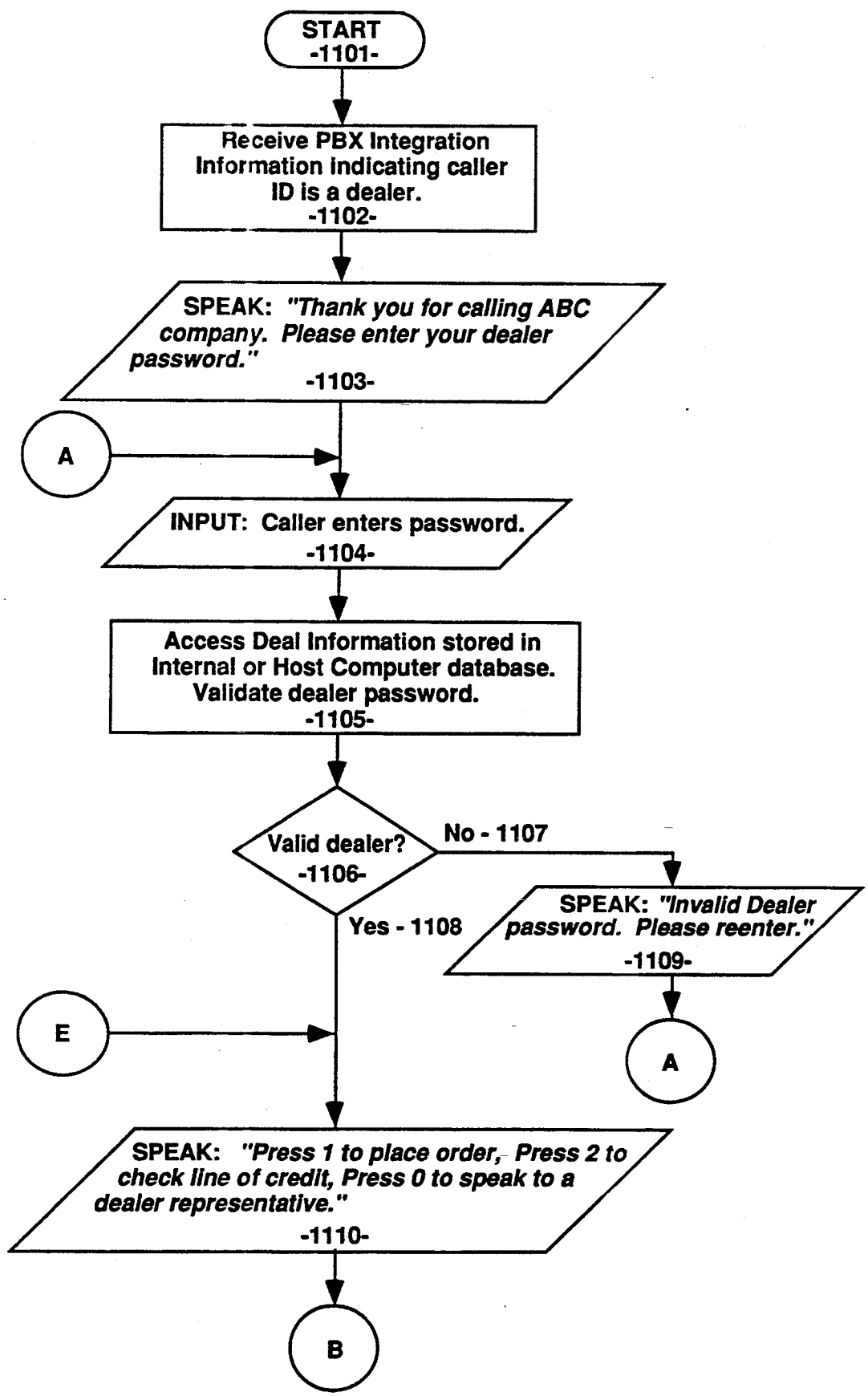
Figure 10B:
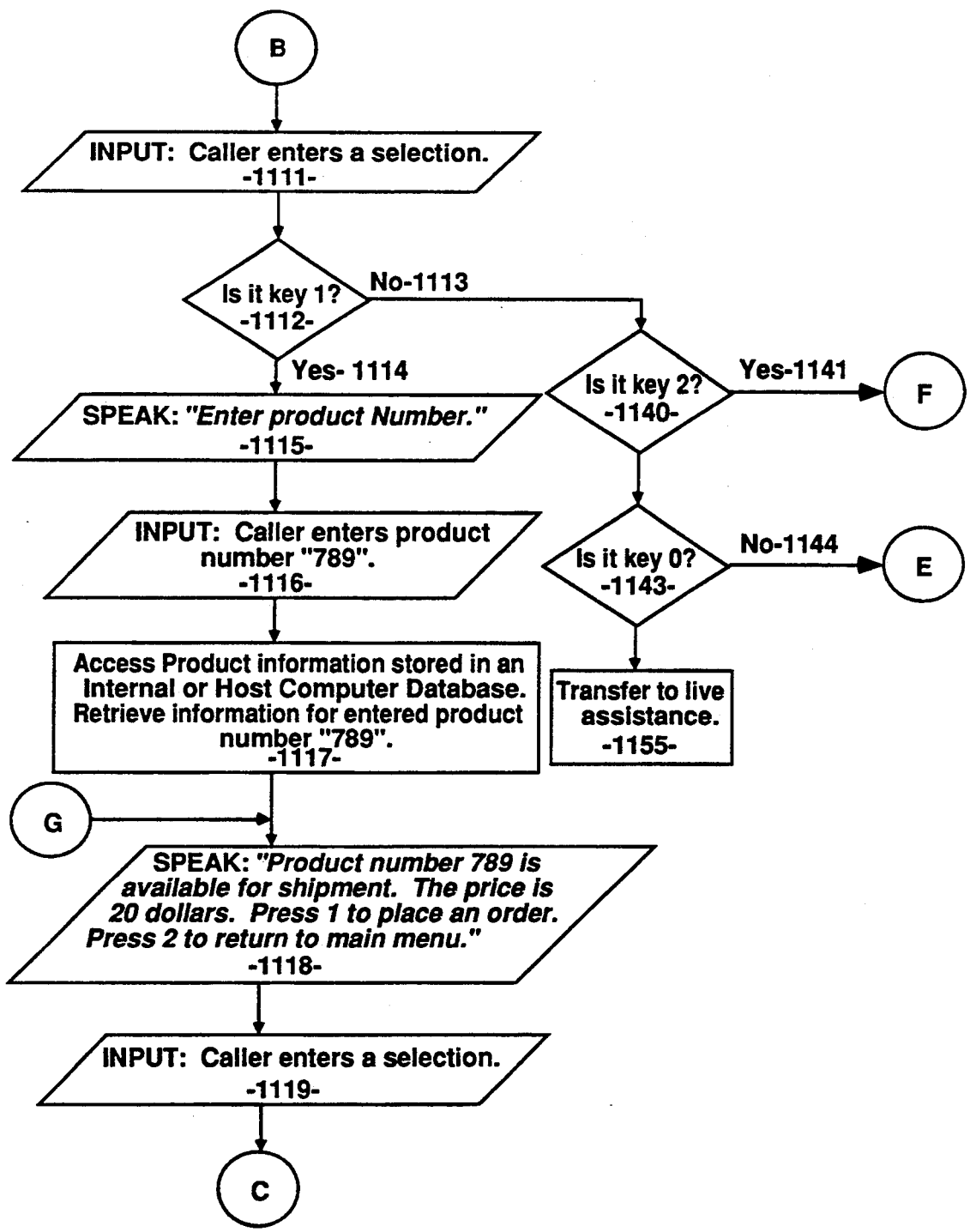
Figure 10C:
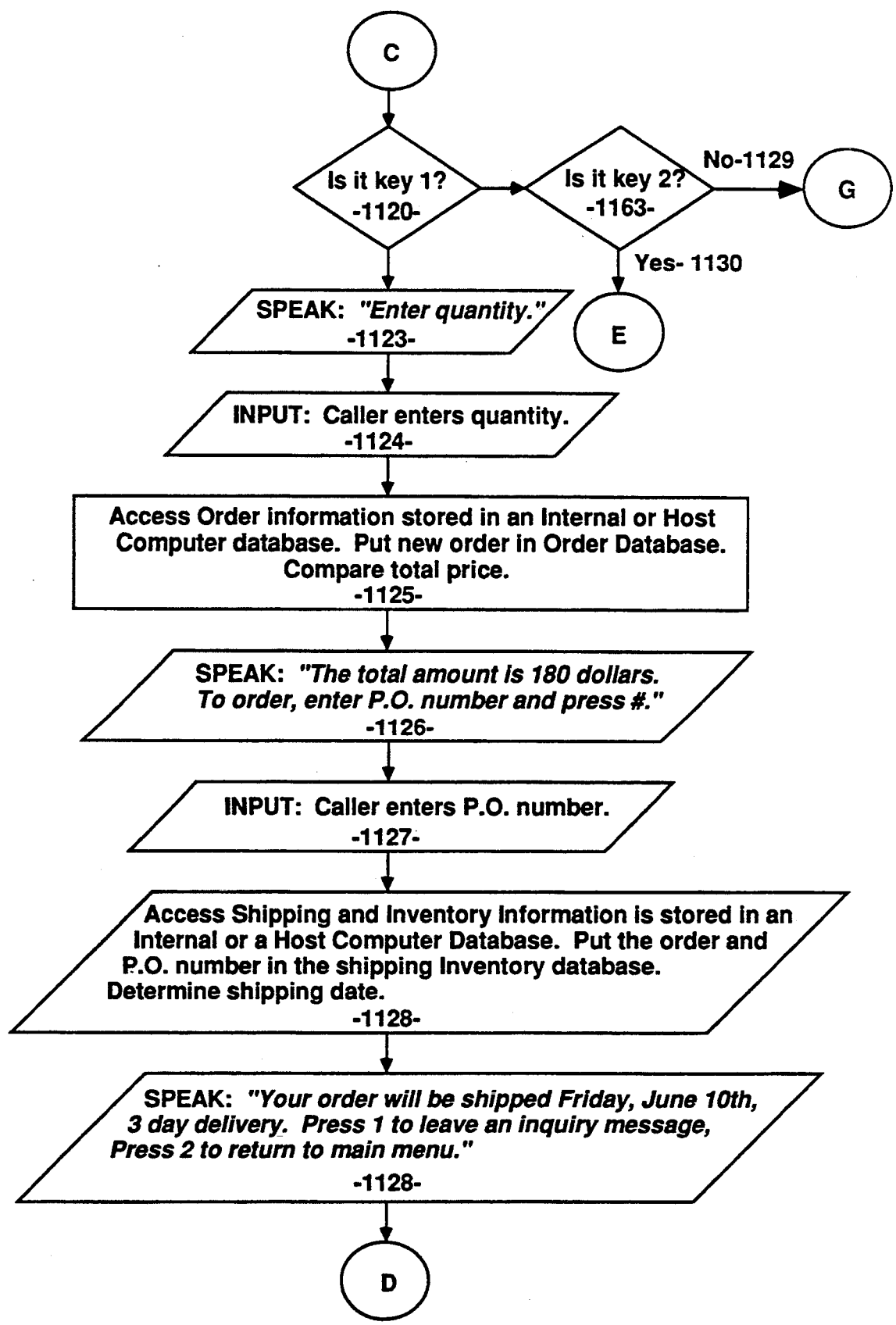
Figure 10D:
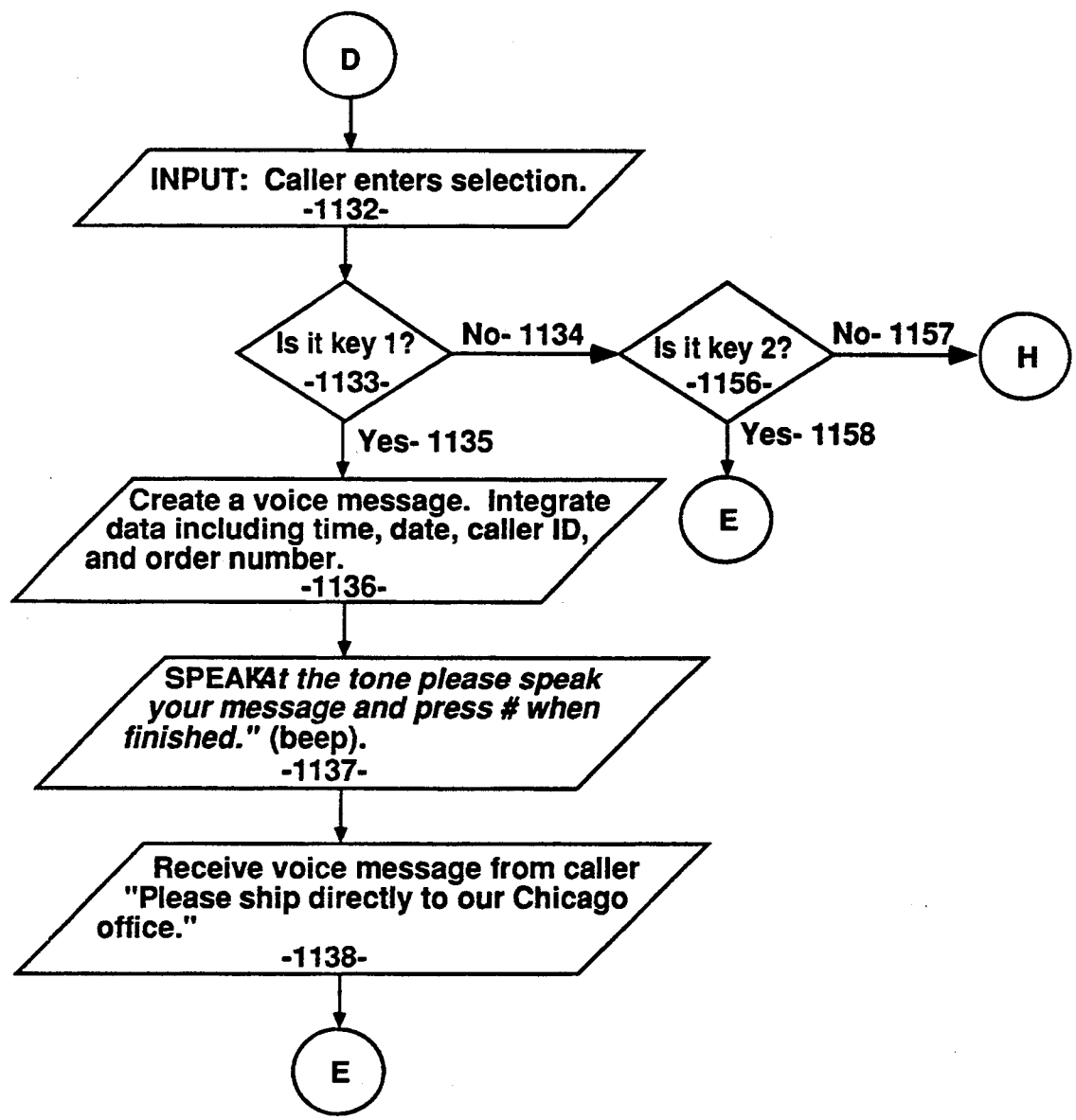
Figure 10E:
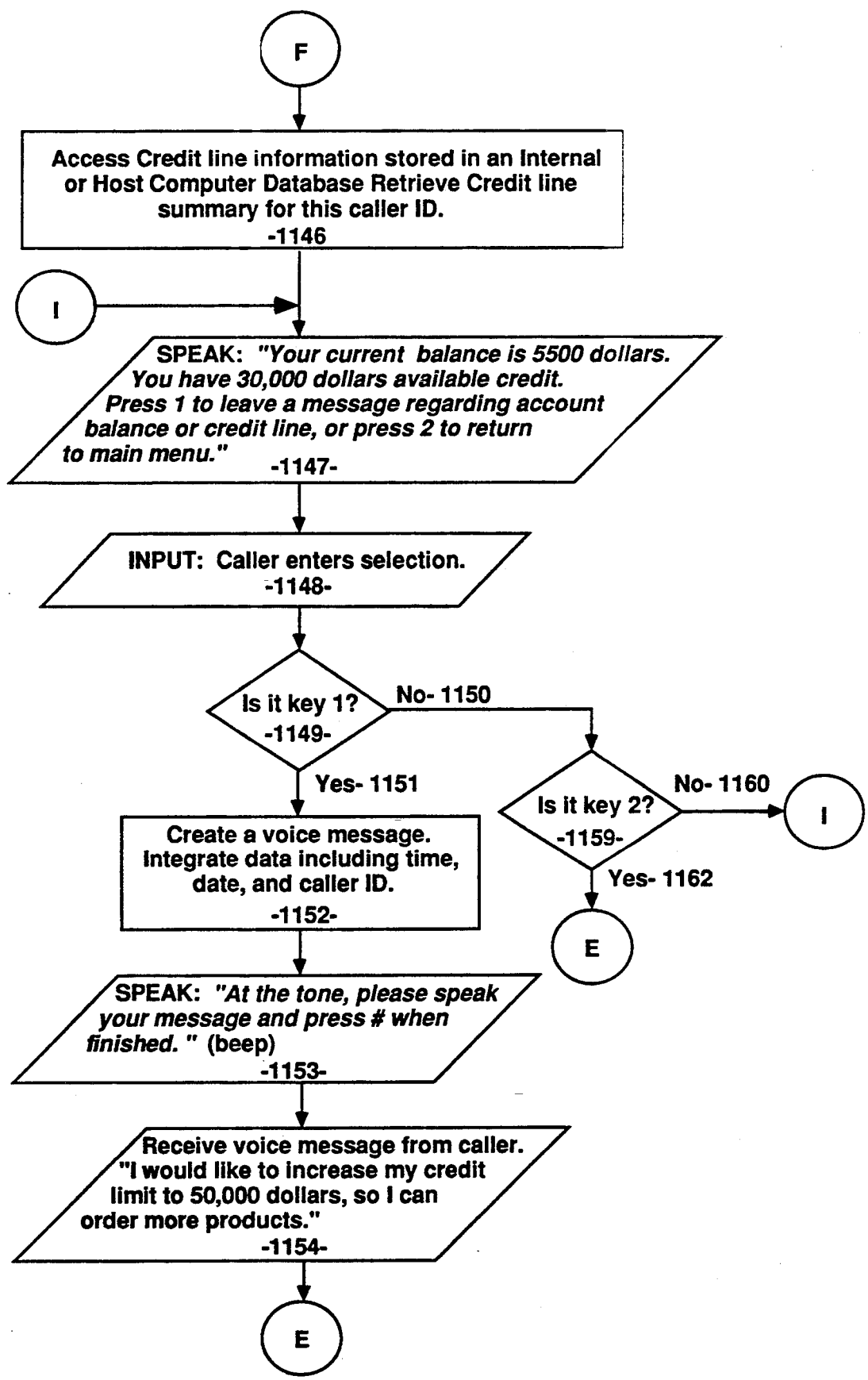

Referring again to FIG. 9a, if key 3 on the telephone keypad is depressed by a caller, processing path 1069 is taken to the bubble labeled N illustrated in FIG. 9e. Referring now to FIG. 9e, processing in response to an operator request to check on a response to a previous inquiry is illustrated. First, the SPEAK command is used to prompt the caller to enter the inquiry number (processing box 1051). Next, the INPUT command is used to retrieve the inquiry number entered by the caller (processing box 1052). The inquiry database is then accessed. Using the inquiry number entered by the caller, the inquiry record associated with the inquiry is retrieved. Similarly, the message number associated with the original inquiry message is retrieved (processing box 1053). Using the message number of the original inquiry, the original inquiry message is spoken to the caller using the SPEAK command (processing box 1054). Next, the message number of the technician's response to the original inquiry message is retrieved from the inquiry record in the inquiry database (processing box 1055). The technician's response is spoken to the caller using the SPEAK command (processing box 1056). Current information such as date and time can also be integrated into the message. Call flow processing then is transferred back to the bubble labeled K illustrated in FIG. 9a where the initial announcement message, menu of command selections, and prompt is spoken to the caller. Thus, call flow processing in a help line application for a call received by a caller making an inquiry is described.

A related call flow for the help line application is illustrated in FIGS. 9c and 9d. FIGS. 9c and 9d illustrate call flow processing for a call received by a technician placing an incoming call on a line dedicated to technicians or specialists servicing callers making inquiries to the help line. This call flow is initiated in a matter similar to that described earlier.

Referring now to FIG. 9c, a call flow is illustrated for an incoming call received by the call processing and messaging system from a technician or specialist servicing inquiries to a help line. When the flow is initiated, processing starts at the bubble labeled 1030. Using information received from the PBX and the VMS, the applications processor identifies the caller ID as a technician (processing box 1031). When this occurs, the inquiry database is accessed using the SELECT command the FIND command. The inquiry database is searched for new inquiries. If a new inquiry is found, the message number associated with the new inquiry is retrieved from the database (processing box 1032). Using the SPEAK command, the inquiry found in the inquiry database is spoken to the technician (processing box 1033). In addition, the name of the caller making the inquiry, the time of day and the date is incorporated into the message spoken to the technician. Having spoken the inquiry to the technician, the technician is prompted to enter a selection corresponding to the desired action to be subsequently taken. In the example presented in FIG. 9c, the technician is prompted to press a 1 to reply to the inquiry and forward the reply now, to press 2 to reply to the message later, or to press 3 to speak directly to the caller making the inquiry. The INPUT command is used to receive the selection made by the caller (processing box 1034). If the technician enters the 1 key (processing path 1037), a reply to the inquiry is processed immediately starting at processing box 1044. If the technician enters the 2 key (processing path 1040), the call flow terminates at termination box 1041. If the technician enters the 3 key (processing path 1070), the applications processor dials the telephone number entered by the caller when the original inquiry was recorded (processing box 1043). The call is placed using the CALL command provided by the call flow language of the present invention. Once the call is placed, subsequent automatic call flow processing is preempted. If the technician does not enter a 1, 2, or 3 key or a timeout occurs on the entry of one of the keys, processing transfers to the bubble labeled J illustrated in FIG. 9c. At bubble J in FIG. 9c, the technician is again prompted to enter a selection.

Referring again to FIG. 9c at processing box 1044, the calling technician has chosen to reply to the new inquiry and to forward his response immediately. Using the RECORD NEW command construct, a new voice message is created for storing the technician's response to the inquiry. Additional information such as date and time are also integrated into the message (processing box 1044). Processing for the call flow then is transferred to the bubble labeled M illustrated starting in FIG. 9d. Referring now to FIG. 9d, the SPEAK command is used to prompt the technician to speak his response to the inquiry made by the original help desk caller (processing box 1045). Using the RECORD command, the voice response spoken by the technician is received and stored in the new message (processing box 1046). Once the technician completes the entry of his response, the inquiry database is accessed and the response message number is stored in the inquiry record (processing box 1047). Processing then terminates for this call flow at processing box 1048). Thus, a method and means for implementing a help desk using the present invention is described.

A third example of the operation of the present invention is illustrated in FIGS. 10a through 10e. The call flow illustrated in FIGS. 10a through 10e implements a streamlined order entry and tracking system using the applications hardware and call flow processing logic of the present invention. In a manner similar to the operation in the first two examples presented above, the call flow language commands are used for processing and order entry call at each step in the application. Using commands provided by the call flow language, various databases of information are accessed and updated as the call is being serviced. Thus, the present invention provides a flexible and dynamic call processing and messaging system providing seamless access to data and voice messages.

Thus, an integrated application controlled call processing and messaging system for improved call processing and voice messaging is disclosed.

Although the invention has been described herein with reference to a specific embodiment, many modifications and variations therein will readily occur to those skilled in the art. Accordingly, all such variations and modifications are included within the intended scope of the present invention as defined by the following claims.

| LISTING A |
| --- |
| 10 NUM: 4 RATE |
| 20 CHAR:8 ACCTNUM |
| 30 NUM:2 ACCTBAL |
| 40 CHAR: 3 ASSISTEXT |
| 50 DEFAULT ON CN$FAIL GOTO ASSISTANCE |
| 60 DEFAULT ON CN$TMOLIMIT GOTO ENDCALL |
| 70 DEFAULT ON CN$INVLIMIT GOTO ASSISTANCE |
| 80 DEFAULT ON CN$LOCKED GOTO ASSISTANCE |

-continued

LISTING A

```
90   "INITIALIZE ASSIST EXTENSION AND LOCAL DATABASE
100  LET ASSISTEXT = '333'
110  SELECT LDINTRST
120  SELECT LDBAL
130  "BEGIN CALLER INTERACTION
140  SPEAK WELCOME AS PROMPT
150  GIVOPTS:
160  SPEAK SELECTIO AS PROMPT
170  MENU
180  ON CN$TIMEOUT GOTO GIVOPTS
190  ON [1] GOSUB RATEINFO
200  ON [2] GOTO SAVEINFO
210  ON [3] GOTO ENDCALL
220  GOTO GIVOPTS
230  "--ASK FOR ACCT NUMBER
240  SAVEINFO:
250  SPEAK INACCT AS PROMPT
260  INPUT ACCTNUM LENGTH 4 TO 8
270  ON CN$TIMEOUT GOTO SAVEINFO
280  ON CN$INVALID GOTO BADNUM
290  "USE THE LOCAL DATABASE TO VALIDATE ACCOUNT
300  "IN FIND FAILS IT IS AN INVALID ACCOUNT
310  FIND FIRST RECORD WITH ACCTFLD = ACCTNUM USING LDBAL
320  ON CN$FAIL GOTO BADNUM
330  GET ACCTBAL AT BALFLD USING LDBAL
340  SPEAK BALANCIS AS PROMPT
350  SPEAK ACCTBAL AS NUMERIC
360  GOTO GIVEOPTS
370  "--INVALID ACCT ENTERED
380  BADNUM:
390  SPEAK INVACCT AS PROMPT
400  "--TRANSFER CALLER TO LIVE ASSISTANCE
450  ASSISTANCE:
460  TRANSFER ASSISTEXT
470  ON CN$FAIL GOTO XFERFAIL
480  CONNECT
490  ENDFLOW
500  XFERFAIL:
510  SPEAK PLSWAIT AS PROMPT
520  WAIT 10
530  GOTO ASSISTANCE
540  ENDCALL:
550  SPEAK THANKYOU AS PROMPT
560  ENDFLOW
570  "--GIVE CURRENT RATE INFORMATION
580  STARTSUB RATEINFO
590  FIND NTH RECORD WITH RECORD = 1 USING LDINTRST
600  GET RATE AT RATEFLD USING LDINTRST
610  SPEAK CURRENT AS PROMPT
620  SPEAK RATE AS NUMERIC
630  ENDSUB
```

We claim:

1. A call processing and messaging system, comprising:

call receiving means having a plurality of lines for receiving a first incoming call from one of said lines;

means for storing a message from said first incoming call;

means for assigning a message identifier to said message, said message identifier being assigned without caller intervention;

means for dynamically generating an inquiry reference number;

means for storing said message identifier and said inquiry reference number;

means for speaking said inquiry reference number to a caller;

said call receiving means having means for receiving a second incoming call from one of said lines;

means for receiving said inquiry reference number from said second incoming call;

means for retrieving said message identifier using said inquiry reference number; and means for playing said message to which said message identifier is assigned.

2. In a call processing and messaging system, a method for processing messages, said method comprising the steps of:

receiving a first incoming call;

storing a message from said first incoming call;

assigning a message identifier to said message, said message identifier being assigned without caller intervention;

dynamically generating an inquiry reference number;

storing said message identifier and said inquiry reference number;

speaking said inquiry reference number to a caller;

receiving a second incoming call;

receiving said inquiry reference number from said second incoming call;

retrieving said message identifier using said inquiry reference number; and playing said message to which said message identifier is assigned.

3. The method as claimed in claim 2 wherein said retrieving step further including a step of retrieving a plurality of message identifiers using said inquiry reference number.

4. The method as claimed in claim 3 further including a step of playing each message to which each message identifier of said plurality of message identifiers is assigned.

5. The method as claimed in claim 2 wherein said assigning step further including a step of assigning a message identifier with a plurality of appended messages.

6. The method as claimed in claim 2 wherein said message identifier is used to reference said message in commands of a call processing script.

7. A call processing and messaging system, comprising:
   call receiving means having a plurality of lines for receiving a first incoming call from one of said lines;
   means for receiving a unique plurality of digits from said first incoming call, said unique plurality of digits not previously known by said call processing and messaging system;
   means for storing a message from said first incoming call;
   means for assigning a message identifier to said message, said message identifier being assigned without caller intervention;
   means for storing said unique plurality of digits and said message identifier;
   said cell receiving means having means for receiving a second incoming call from one of said lines;
   means for receiving said unique plurality of digits from said second incoming call; and
   means for retrieving said message identifier using said unique plurality of digits.

8. The call processing and messaging system as claimed in claim 7 further including means for accessing said message using said message identifier.

9. The call processing and messaging system as claimed in claim 7 further including:
   means for storing a response message to said message;
   means for assigning a response message identifier to said response message, said response message identifier being assigned without caller intervention; and
   means for storing said response message identifier.

10. The call processing and messaging system as claimed in claim 9 further including means for accessing said response message using said response message identifier.

11. The call processing and messaging system as claimed in claim 7 further including means for deleting said unique plurality of digits and said message identifier from said means for storing.

12. In a call processing and messaging system having a storage device and a plurality of lines for receiving an incoming call from one of said lines, a method for processing messages comprising the steps of:
   receiving a unique plurality of digits from a first incoming call, said unique plurality of digits not previously known by said call processing and messaging system;
   storing a message from said first incoming call;
   assigning a message identifier to said message, said message identifier being assigned without caller intervention;
   storing said unique plurality of digits and said message identifier in said storage device;
   receiving a second incoming call from one of said lines;
   receiving said unique plurality of digits from said second incoming call; and
   retrieving said message identifier using said unique plurality of digits.

13. The process as claimed in claim 12 further including a step of accessing said message using said retrieved message identifier.

14. The process as claimed in claim 12 further including the steps of:
   storing a response message to said message;
   assigning a response message identifier to said response message, said response message identifier being assigned without caller intervention; and
   storing said response message identifier in said storage device.

15. The process as claimed in claim 14 further including a step of accessing said response message using said response message identifier.

16. The process as claimed in claim 12 further including a step of deleting said unique plurality of digits and said message identifier from said storage device.

17. A call processing and messaging system, comprising:
   call receiving means having a plurality of lines for receiving a first incoming call from one of said lines;
   means for storing a message from said first incoming call;
   means for assigning a message identifier to said message, said message identifier being assigned without call intervention;
   means for dynamically generating an inquiry reference number;
   means for storing said message identifier and said inquiry reference number;
   means for speaking said inquiry reference number to a caller;
   said call receiving means having means for receiving a second incoming call from one of said lines;
   means for receiving said inquiry reference number from said second incoming call;
   means for retrieving said message identifier using said inquiry reference number;
   means for connecting said call processing and messaging system to an external host computer; and
   means for sending said message identifier to said host computer.

18. The call processing and messaging system as claimed in claim 17 further including means for retrieving said message identifier from said host computer.

19. In a call processing and messaging system, a method for processing messages, said method comprising the steps of:
   receiving a first incoming call;
   storing a message from said first incoming call;
   assigning a message identifier to said message, said message identifier being assigned without caller intervention;
   dynamically generating an inquiry reference number;
   storing said message identifier and said inquiry reference number;

speaking said inquiry reference number to a caller;
receiving a second incoming call;
receiving said inquiry reference number form said second incoming call;
retrieving said message identifier using said inquiry reference number;

connecting said call processing and messaging system to an external host computer; and
sending said message identifier to said host computer.

20. The method as claimed in claim 19 further including a step of retrieving said message identifier from said host computer.

* * * * *

UNITED STATES PATENT AND TRADEMARK OFFICE
CERTIFICATE OF CORRECTION

PATENT NO. : 5,355,406
DATED : October 11, 1994
INVENTOR(S) : Arnold Chencinski et al.

It is certified that error appears in the above-identified patent and that said Letters Patent is hereby corrected as shown below:

On the title page, item [21], delete "24,796" and replace with --024,796--.

In column 2, line 9, delete "places" and replace with --placed--.

In column 2, line 40, after "prior" insert --art--.

In column 6, line 59, delete "tern-final" and replace with --terminal--.

In column 9, line 48, after "applications" delete --,--.

In column 10, line 26, delete "71 1" and replace with --711--.

In column 10, line 34, before "group" insert --a--.

In column 10, line 43, delete "in-formation" and replace with --information--.

In column 10, line 58, delete "processes" and replace with --processed--.

In column 12, line 22, after "such" insert --as--.

In column 14, line 6, delete "filed" and replace with --field--.

In column 15, line 6, delete "on" and replace with --one--.

In column 18, line 56 delete "HOSTRCV"

In column 18, line 57 insert "HOSTRCV" onto new line.

In column 18, line 66 delete "≥" and replace with -->=--.

In column 18, line 67 delete "≤" and replace with --<=--.

In column 20, line 58 after "the" insert --FOR--.

In column 21, line 28 delete "them" and replace with --there--.

In column 21, line 52 delete "A." and replace with --A,--.

In column 23, line 53 delete "an".

In column 24, line 7, delete "tip" and replace with --up--.

In column 24, line 53, delete "1012" and replace with --1-12--.

In column 26, line 3, delete "second" and replace with --seconds--.

In column 26, line 48, delete the second occurrence of "to".

UNITED STATES PATENT AND TRADEMARK OFFICE
CERTIFICATE OF CORRECTION

PATENT NO. : 5,355,406
DATED : October 11, 1994
INVENTOR(S) : Arnold Chencinski et al.

It is certified that error appears in the above-identified patent and that said Letters Patent is hereby corrected as shown below:

In column 27, line 44, delete "distinguished" and replace with --distinguish--.
In column 30, line 9, delete "hisser" and replace with --his/her--.
In column 30, line 13, delete "hisser" and replace with --his/her--.
In column 30, line 46, after "SPEAK", insert --command--.
In column 30, line 52, delete "'time" and replace with --time--.
In column 31, line 34, after "command" insert --and--.
In column 32, line 31, delete "1048)" insert --1048--.
In column 32, line 41, delete "and" insert --an--.
In column 33, item 610, delete "CURRENT" insert --CURRATE--.
In column 35, line 35, delete "cell" and replace with --call--.
In column 36, line 38, delete "call" and replace with --caller--.
In column 37, line 3, delete "form" and replace with --from--.

Signed and Sealed this

Eleventh Day of April, 1995

Attest:

BRUCE LEHMAN

*Attesting Officer*   *Commissioner of Patents and Trademarks*